No. 717,732. PATENTED JAN. 6, 1903.
G. C. BLICKENSDERFER.
TYPE WRITING MACHINE.
APPLICATION FILED DEC. 12, 1901.
NO MODEL. 9 SHEETS—SHEET 5.

Attest:
T. F. Kehoe
J. A. Graves

Inventor:
George C. Blickensderfer
by Philipp, Sawyer, Rice & Kennedy
Attys

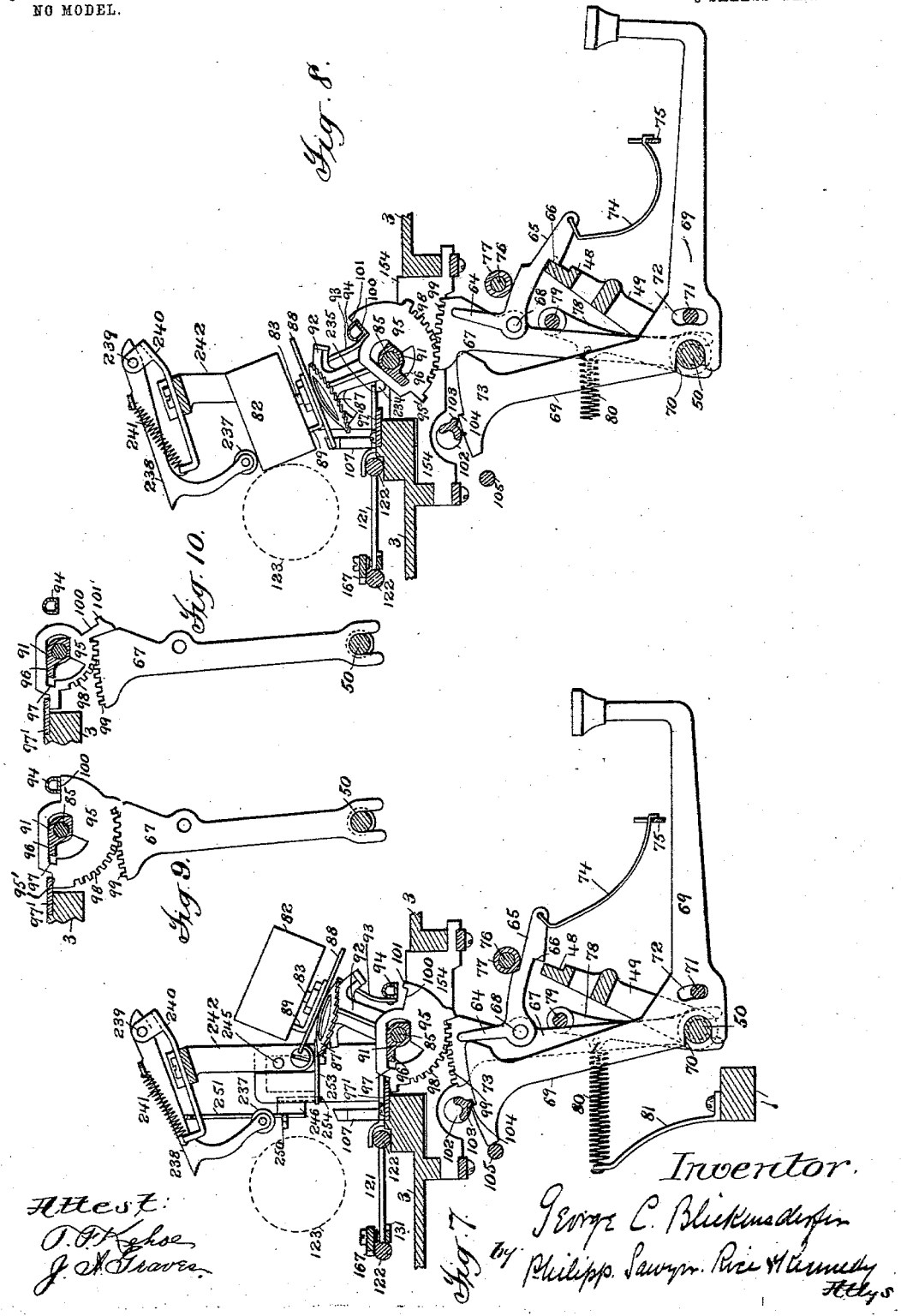

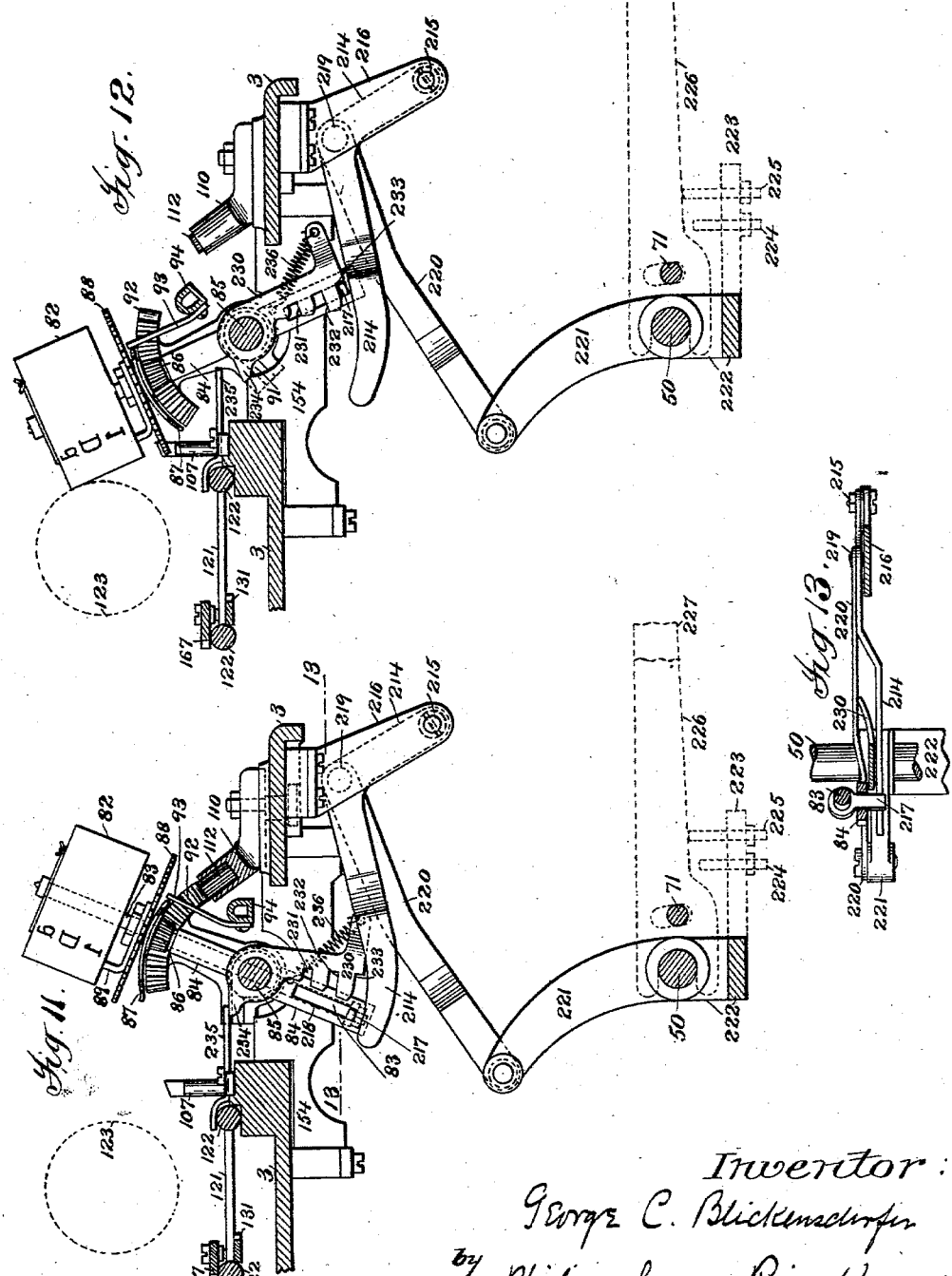

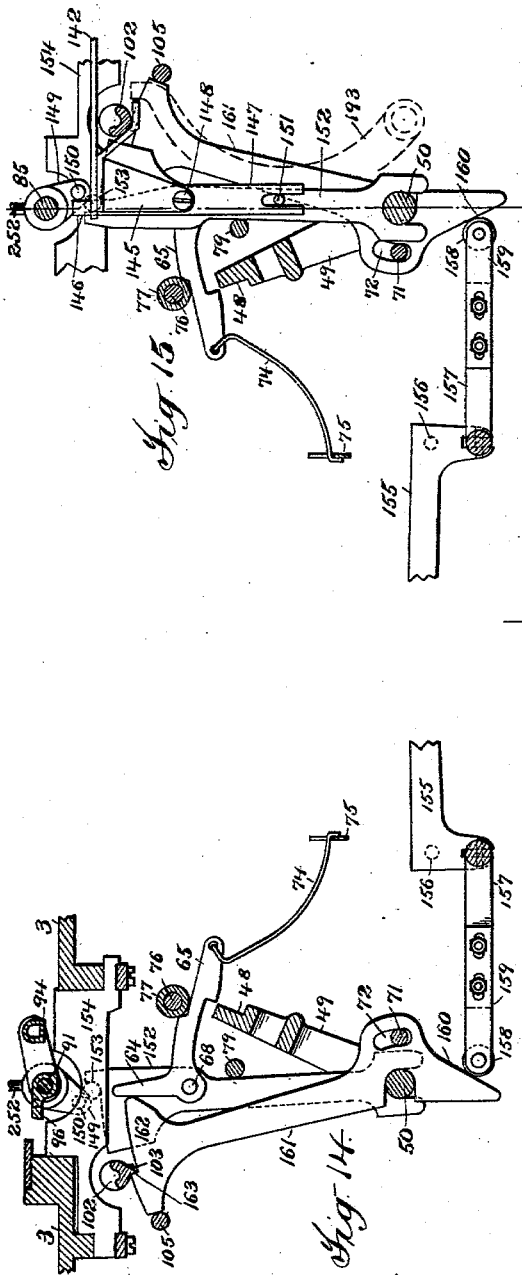
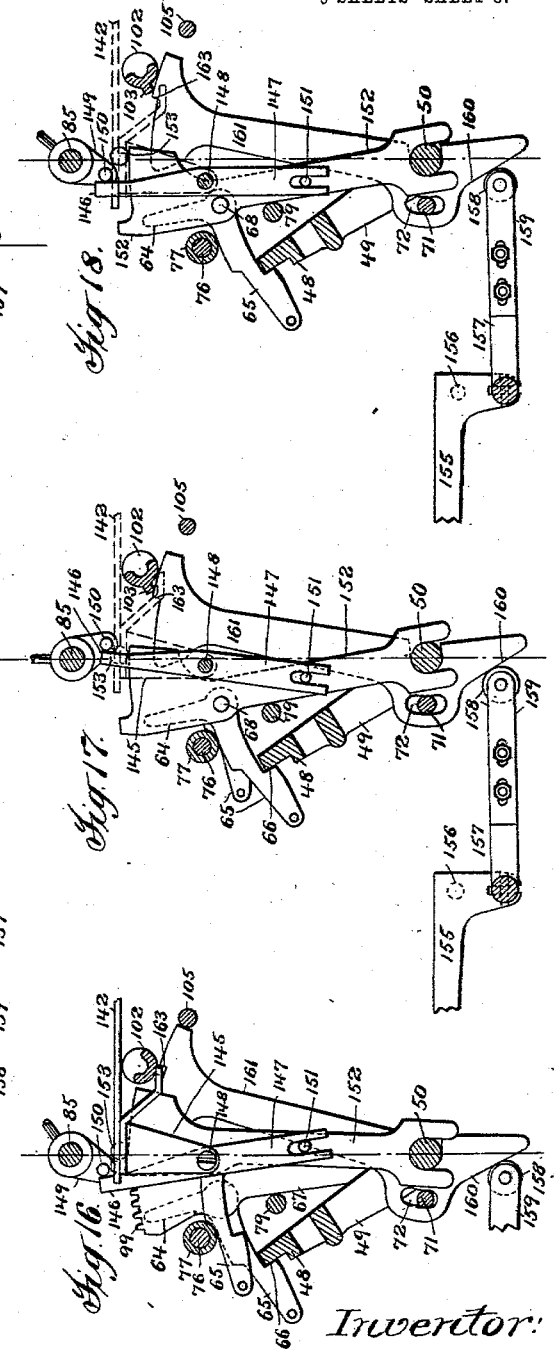

No. 717,732. PATENTED JAN. 6, 1903.
G. C. BLICKENSDERFER.
TYPE WRITING MACHINE.
APPLICATION FILED DEC. 12, 1901.
NO MODEL. 9 SHEETS—SHEET 9.
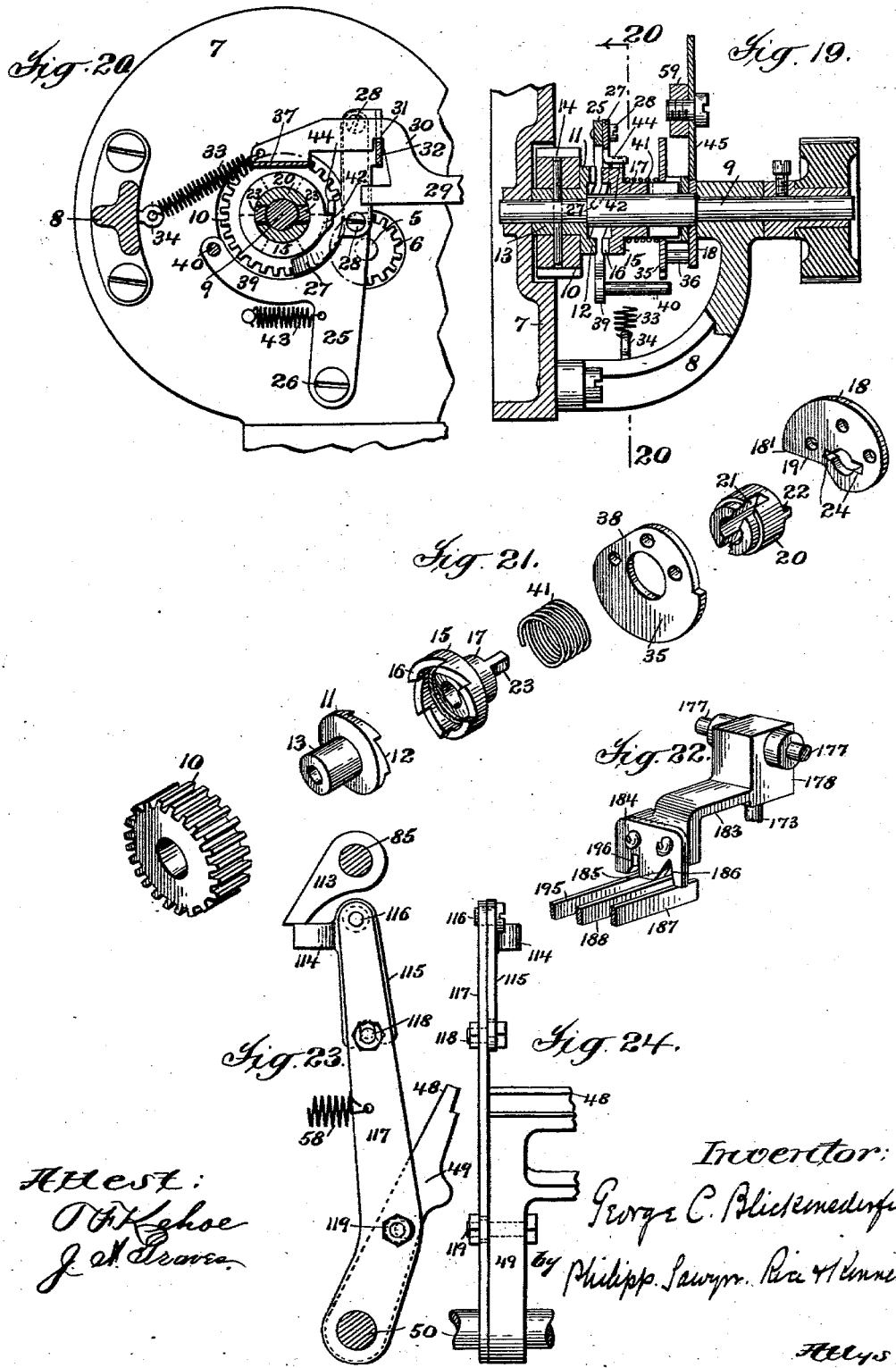

UNITED STATES PATENT OFFICE.

GEORGE C. BLICKENSDERFER, OF STAMFORD, CONNECTICUT.

TYPE-WRITING MACHINE.

SPECIFICATION forming part of Letters Patent No. 717,732, dated January 6, 1903.

Application filed December 12, 1901. Serial No. 85,682. (No model.)

*To all whom it may concern:*

Be it known that I, GEORGE C. BLICKENSDERFER, a citizen of the United States, residing at Stamford, county of Fairfield, and State of Connecticut, have invented certain new and useful Improvements in Type-Writing Machines, fully described and represented in the following specification and the accompanying drawings, forming a part of the same.

This invention relates to certain improvements in type-writing machines.

In Patent No. 656,085, granted August 14, 1900, to George C. Blickensderfer, there is disclosed a power-driven type-writing machine. The object of the present invention is to produce certain improvements which, specifically considered, are applicable to type-writing machines of the class to which the machine shown in said patent belongs, and some of which, generically considered, are applicable to other machines.

With this and other objects in view the invention consists in certain constructions and in certain parts, improvements, and combinations, as will be hereinafter fully described and then specifically pointed out in the claims hereunto appended.

Figure 1:
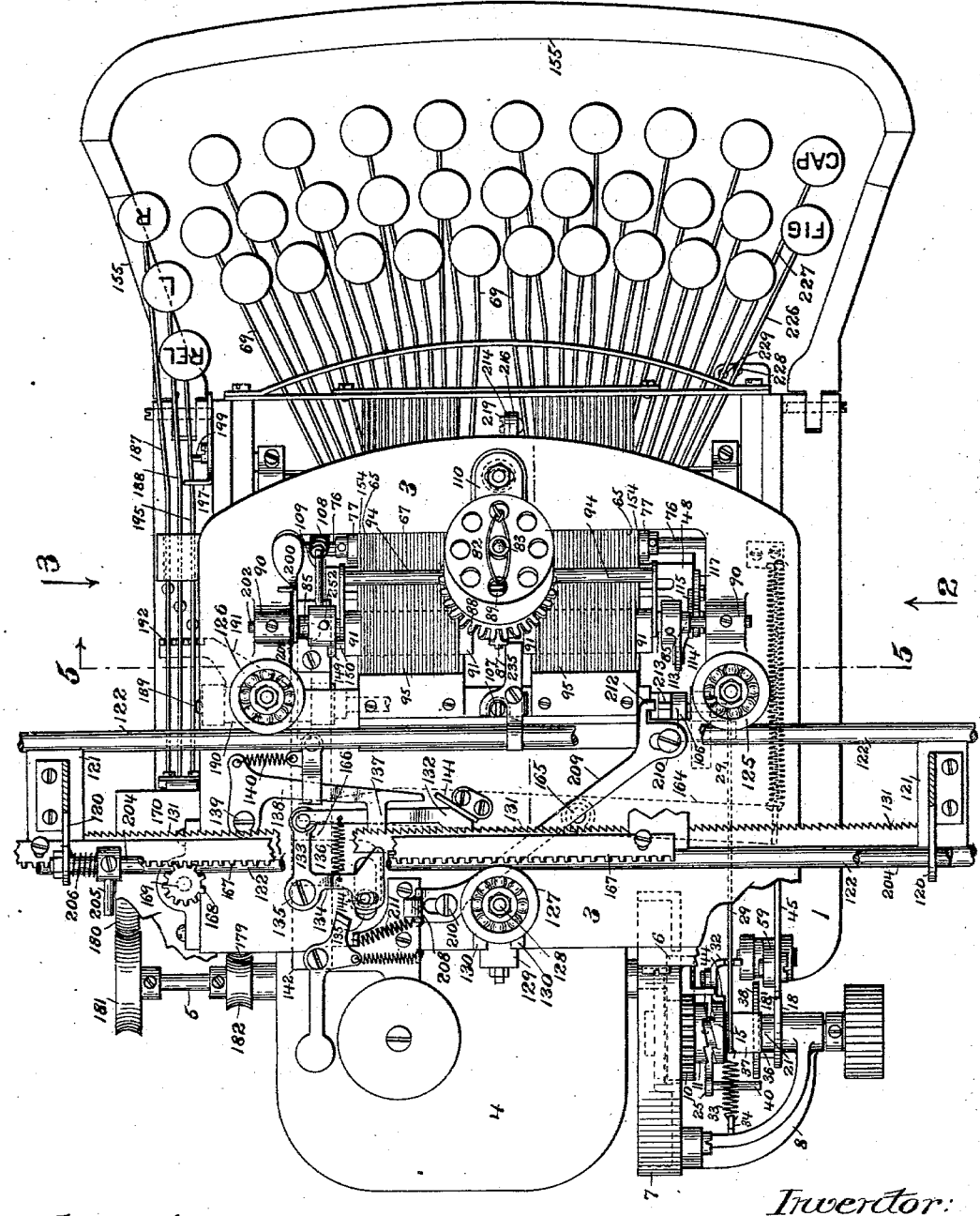
Figure 2:
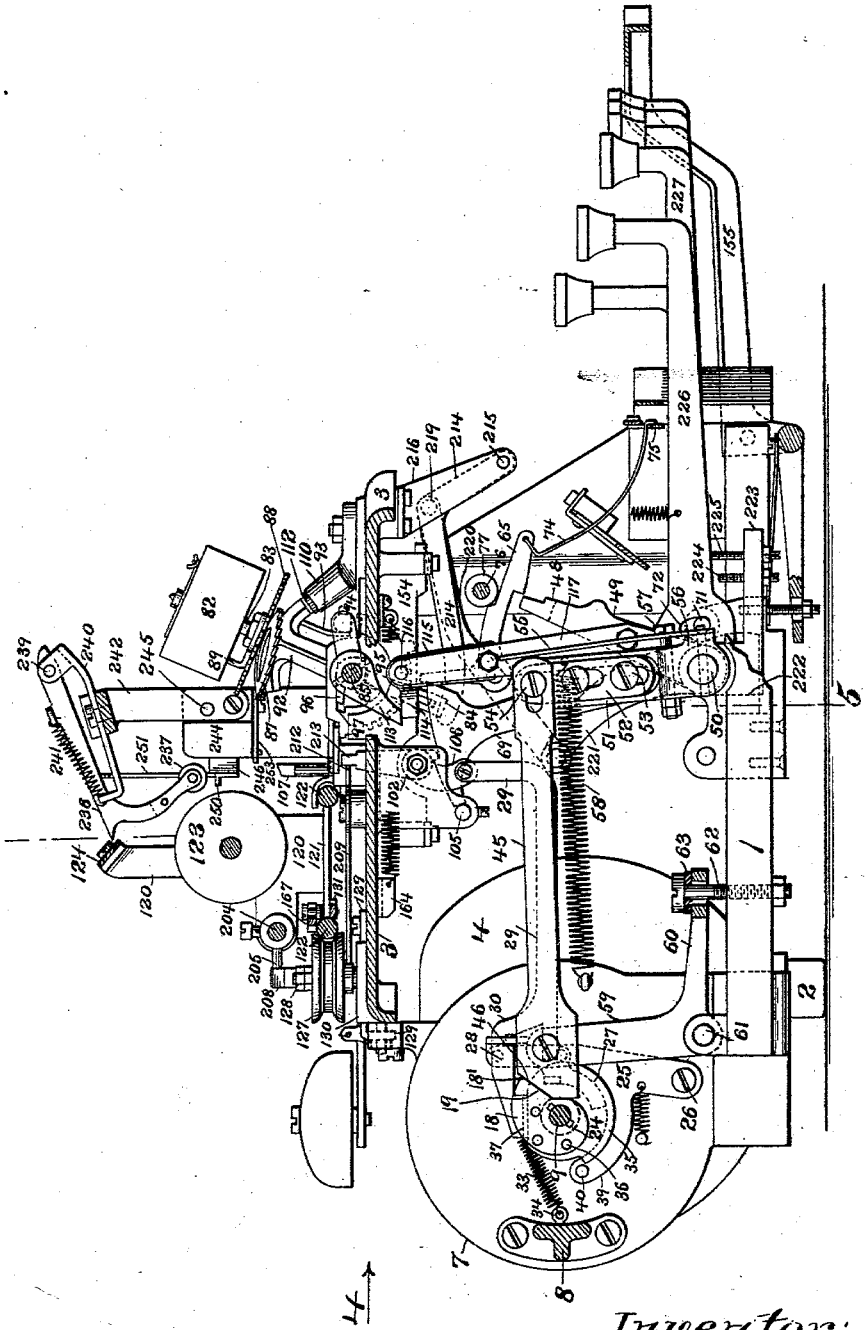
Figure 3:
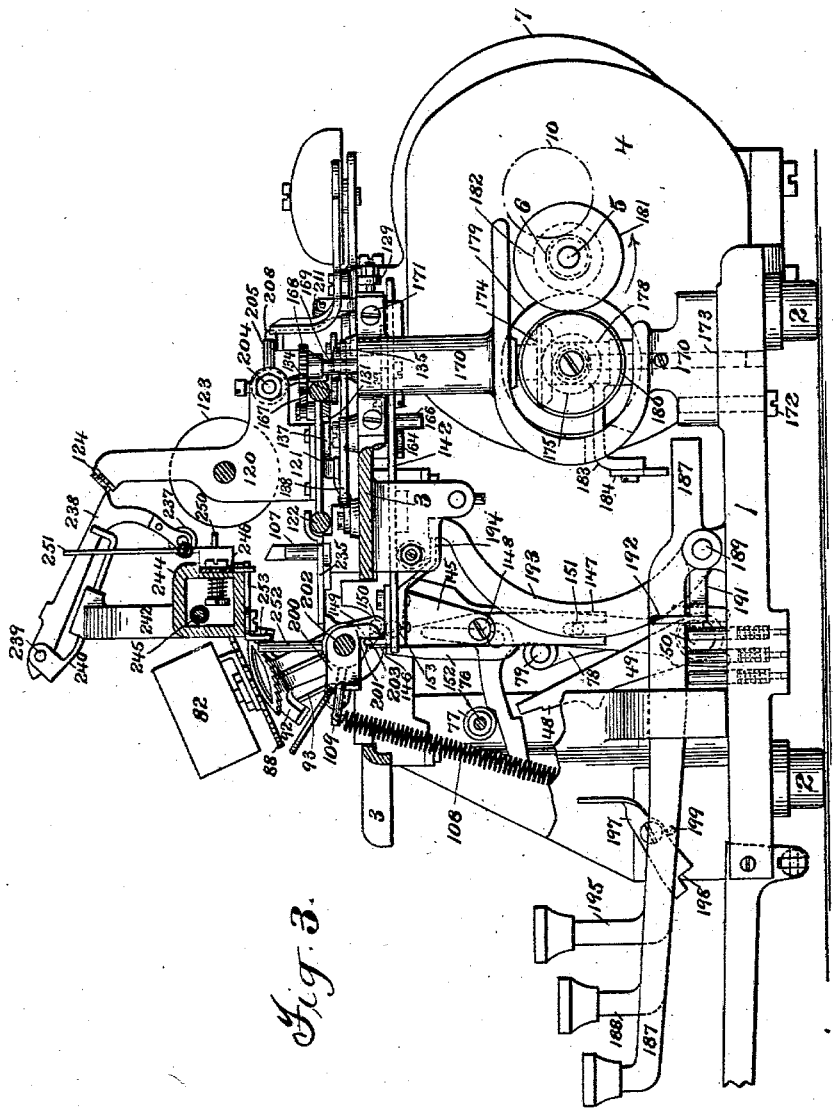
Figure 4:
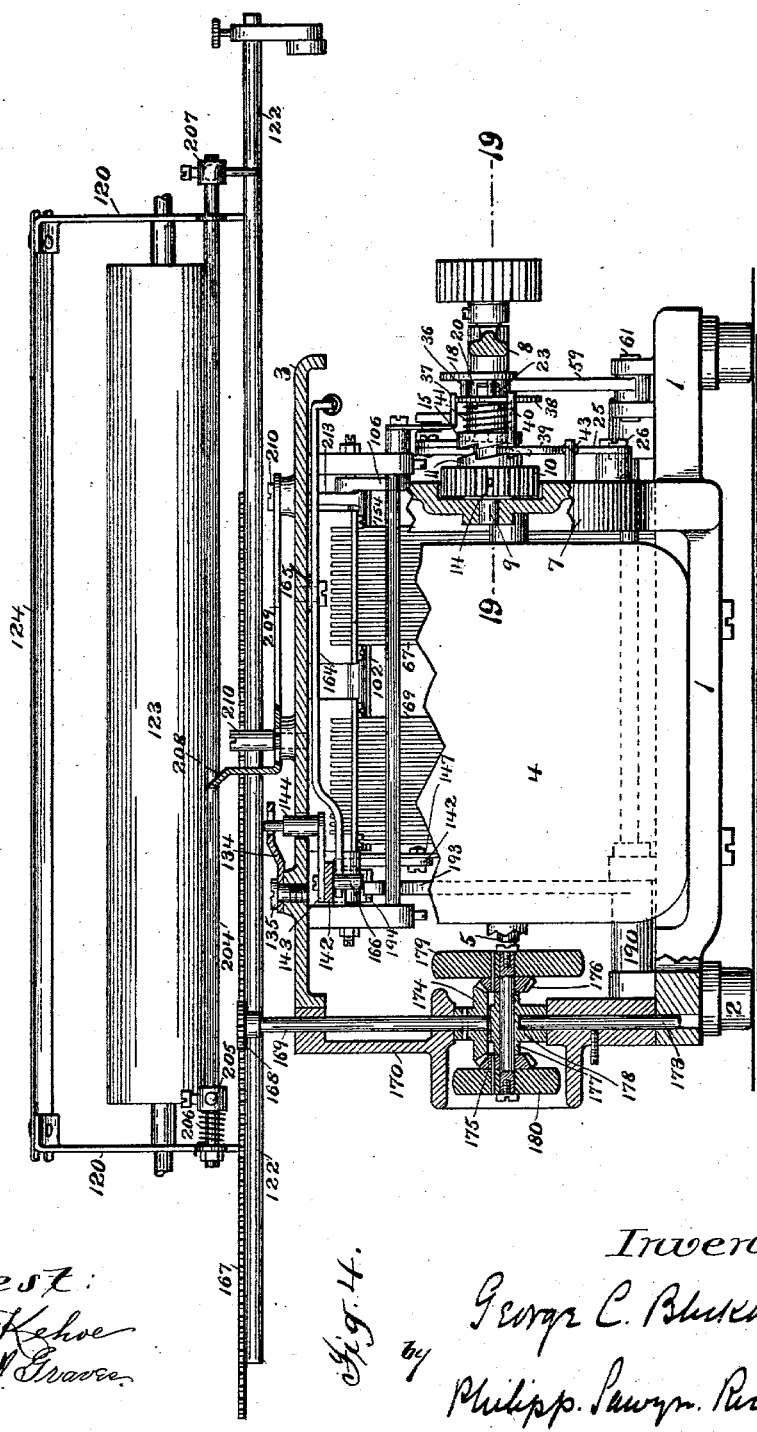
Figure 5:
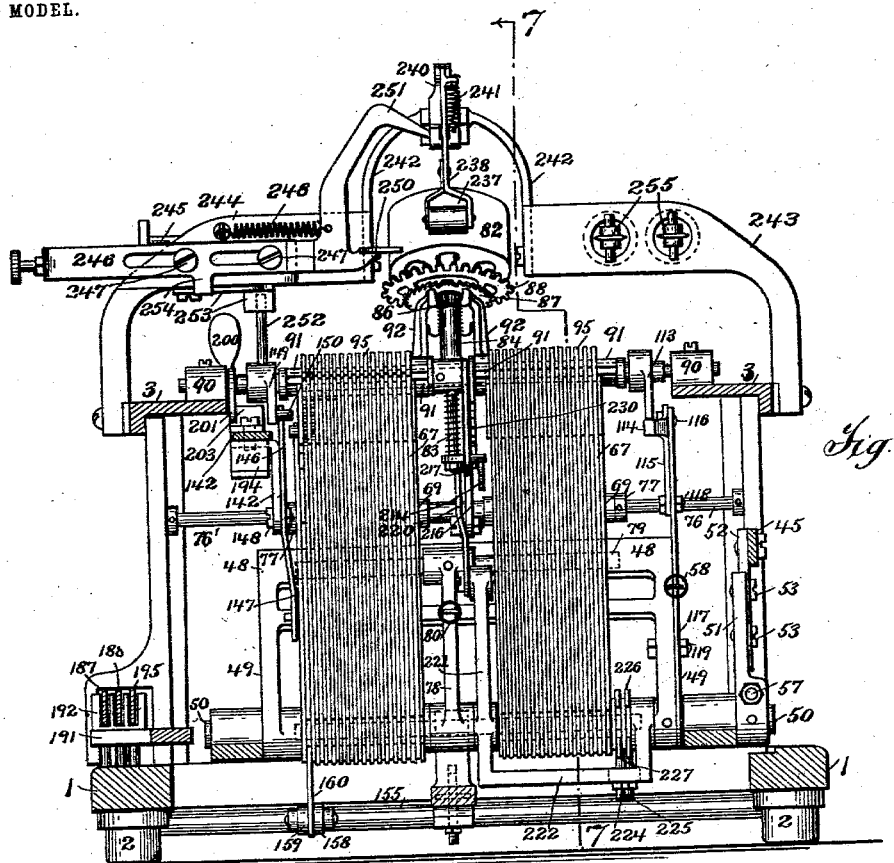
Figure 6:
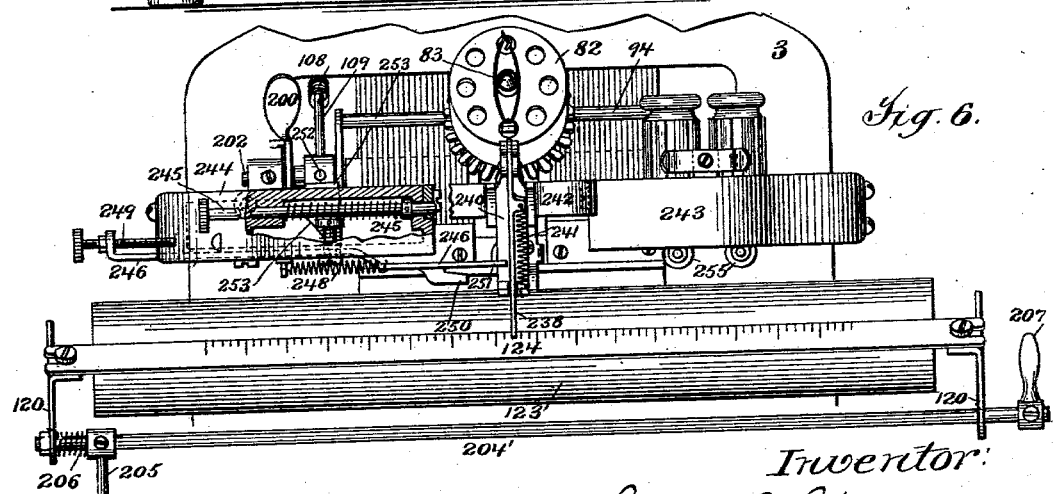

In the accompanying drawings, which form a part of this specification and in which like characters of reference indicate the same parts, Figure 1 is a plan view of a type-writing machine constructed in accordance with the invention. Fig. 2 is a side view, partly in section, the position of the observer being indicated by the arrow 2 in Fig. 1. Fig. 3 is a side view, partly in section, of the machine shown in Fig. 1, the position of the observer being indicated by the arrow 3 in said figure. Fig. 4 is a rear elevation, partly in section, the position of the observer being indicated by the arrow 4 in Fig. 2. Fig. 5 is a sectional elevation, the plane of section being indicated by the lines 5 5 in Figs. 1 and 2. Fig. 6 is a detail plan view of the carriage, type-carrier, and certain parts positioned near them. Figs. 7 and 8 are sectional elevations illustrating the mechanism for producing the printing movement of the type-carrier, Fig. 7 illustrating the position of the parts before and Fig. 8 after a key is depressed, the plane of section being indicated by the line 7 7 in Fig. 5. Figs. 9 and 10 are detail views illustrating two of the segment-levers and the tumblers with which they engage. Figs. 11, 12, and 13 are detail sectional elevations illustrating more particularly the mechanism for positioning the type-carrier, but showing also certain other details of construction. Figs. 14, 15, 16, 17, and 18 are detail sectional elevations illustrating more particularly the construction for operating the spacing mechanism and parts immediately connected therewith. Fig. 19 is a sectional elevation of the clutch and driving mechanism employed and also showing some features of construction immediately connected therewith. Fig. 20 is a section on the line 20 20 of Figs. 4 and 19. Fig. 21 is a view illustrating certain parts of the clutch and driver mechanism. Fig. 22 is a detail view of certain features of construction connected with the carriage-returning mechanism. Figs. 23 and 24 are detail views of certain features of construction relating to the locking mechanism for the type-carrier-operating mechanism.

Referring to the drawings, which disclose a machine which has been selected to illustrate a concrete embodiment of the invention, the frame in which the parts are mounted may be of any suitable form and constructed in any suitable manner. As shown, it embodies a base-plate 1, mounted on suitable supports or feet 2, and a top plate 3, which is supported above the base in any suitable manner. The machine which has been selected to illustrate the invention is a power-driven machine. The means by which the power is applied for the purpose of operating the machine may be of any suitable description; but preferably each machine will be provided with an independent motor mechanism. Any desired form of motor may be employed, although an electric motor will preferably be used, and in the preferred form of construction this motor mechanism will be constantly driven. In the construction shown the machine is provided with a casing 4, which is located at the rear of the machine and in which the motor mechanism is inclosed. This motor mechanism includes a power-shaft 5, which in the preferred form of the construction is a constantly-running shaft and is provided with a driving-gear 6. (See Fig. 20.)

In the preferred form of the construction while the driving mechanism is in constant operation the type mechanism will be normally stationary, said mechanism being thrown into and out of operative relation with the power mechanism for each printing operation. In the preferred construction, furthermore, the means by which the power mechanism is thus caused to operate the type mechanism will embody a suitable clutch, which may be widely varied in its construction. As shown, there is provided a supporting-frame 7, which is located in proximity to one of the ends of the motor-casing. Projecting from this frame 7 is an arm or bracket 8, and suitably journaled in this arm or bracket and in the frame 7 is a short shaft 9, which is driven in any suitable manner from the motor-shaft. As shown, it is provided with a gear 10, which meshes with the gear 6, the gear 10 being secured to the shaft 9 in such a manner that the shaft is constantly driven.

The clutch employed will preferably be a face-clutch, the two parts of the clutch being preferably provided with engaging teeth. As shown, one part of the clutch embodies a face-plate 11, provided with teeth 12, said plate being mounted on or formed integral with a boss or hub 13, which serves to support the gear 15, a pin 14, which passes through the gear, the hub, and the shaft 9, operating to secure these parts together. The coöperating part of the clutch consists of a face-plate 15, provided with teeth 16, said plate being mounted on or formed integral with a hub 17, through which the shaft 9 passes. This hub 17 is loosely mounted on the shaft, which therefore turns without turning the clutch member 15 except when this member is engaged with its coöperating member 11.

The clutch when engaged serves to operate a driver, which may be of any suitable construction. As shown, this driver has a rotary movement and consists of a cam 18, which is supported on the shaft 9. This driving-cam is preferably so formed that its eccentricity or driving radius increases very rapidly, and its operating-face also preferably terminates in an abrupt shoulder 18'. Preferably, also, the cam is formed with a straight face or flat side 19. The purpose of these features of construction will be hereinafter stated. This driver may be connected in any suitable manner with the stationary part of the clutch. As shown, there is provided a sleeve 20, having notches 21 and projections 22, said sleeve being mounted on the shaft 9. The hub 17 of the clutch member 15 is provided with projections 23, which engage the notches 21, and the driver is provided with openings 24 on each side of the opening through which the shaft passes, said openings being engaged by the projections 22. The projections 23 are made sufficiently long so that the member 15 may be given the longitudinal movement by which it is engaged with the member 11 without disengaging the projections from the notches 21. It will be seen, therefore, that the clutch members may be engaged and disengaged without disturbing the position of the driver on the shaft.

Suitable means are provided which operate to control the engagement of the members of the clutch. While these means may be of any suitable description, in the construction shown they include a controller-lever 25, pivoted at 26 to the frame 7. A cam 27 is provided which enters between the members of the clutch and forces them out of engagement and holds them disengaged. The position of this cam is determined by the controller-lever 25, the cam being in the construction shown secured to the lever by means of screws 28 or in any other suitable manner.

Any suitable means may be provided for operating the controller. In the construction shown, however, a slide-bar 29 is employed for this purpose, this bar being provided with a hooked end 30, which in turn has a recess 31 cut therein, said recess engaging an extension 32, which is secured to the controller-lever. As shown, the extension 32 is formed in one piece with the shank by which the cam 27 is secured to the controller. The slide-bar 29 has a spring 33 secured to its end, which operates to move the slide-bar toward the clutch at proper times, the other end of the spring being secured to a bracket 34, mounted on the arm 8. With the construction so far described it will be seen that when the slide-bar 29 is moved to the right of the observer in Figs. 2 and 20 the cam 27 will be withdrawn from its position between the members of the clutch, so as to permit them to become engaged.

Means are preferably provided to disengage the slide-bar from the controller as soon as the members of the clutch are fairly engaged, so as to permit the controller to move into position to separate the parts of the clutch as soon as the shaft 9 has completed a revolution, thereby preventing the shaft 9 from making more than one revolution for each engagement of the clutch, and means are also preferably provided for insuring the positive engagement of the cam 27 between the members of the clutch. In the construction shown a cam 35 is provided, which in conjunction with proper agencies accomplishes both these results. This cam 35 is mounted on the sleeve 20 and is connected to the driver 18 by means of pins 36 or in any other suitable manner, so as to turn therewith. The forward end of the slide-bar 29 is provided with an extension 37, which lies in the path of the cam 35, this extension when the parts are quiescent being close to a flat side 38 of the cam. Immediately after the controller is moved to permit the engagement of the parts of the clutch and the driver begins its movement the cam 35 operates upon the extension 37 and lifts the recess 31 off the extension 32, thus leaving the controller free from the slide-bar. The same cam 35 is also preferably relied upon to insure the movement of the controller by which the cam 27 disconnects the parts of the clutch. In the construction shown the controller is provided with an arm 39, from which extends a pin 40, said pin also lying in the path of the cam 35. When the cam in its rotary movement strikes the pin, the controller is thrown into a position where the cam 27 will enter between the parts of the clutch and disengage them, the member 15 of the clutch being moved against the stress of a spring 41, which lies between it and the cam 35 and which, it may be remarked, operates to produce the engagement of the clutch members. In order to enable the cam 27 to give the clutch member 15 the movement described, this member is preferably provided with a projection 42, which engages the cam as the member 15 rotates. In order to steady the movement of the controller 25 and hold it snugly in the position when the cam 27 is operating to hold the members of the clutch apart, a spring 43 is provided, said spring being fastened at one end to the controller-lever and at the other end to a stud or projection on the frame 7.

It is desirable to provide means to insure that the clutch member 15 shall stop when it has completed a revolution. While any suitable means may be employed for this purpose, in the construction shown the projection 42 is provided with a flat side, which engages a projection 44, carried on the controller-lever 25. This projection is so arranged that when the lever is thrown into position to cause the cam 27 to separate the members of the clutch it will be struck by the flat face of the projection 42 and the clutch member 15 thus positively stopped.

In the machine shown the driver operates to produce a movement of an actuating mechanism, which in turn produces the several operations of the machine. The means by which the driver operates the actuating mechanism, which will be hereinafter more specifically described, may be of any desired description. As shown, there is provided (see Fig. 2) a slide-bar 45, against which the end of the driver operates. It has been heretofore stated that the driver is so formed that its eccentricity or driving radius increases very rapidly. As the driver begins to operate on the slide-bar it starts it forward, therefore, with an easy movement, but one which increases very rapidly. The slide-bar, therefore, is given a movement which, while it begins easily, increases very rapidly and in turn transmits the same movement to the actuating mechanism, which will be hereinafter described. This rapidly-increasing movement tends to cause the slide-bar to run slightly ahead of its driving-cam, and the slide-bar reaches the abrupt shoulder on the cam slightly before the type mechanism, which is operated by the actuating mechanism through the slide-bar, strikes the paper. The result of this is that the type mechanism is thrown against the paper by the momentum of the slide-bar and the actuating mechanism and delivers an elastic blow, as distinguished from a punching blow, which would happen were the cam, the slide-bar, and the operating connections all in contact at the time the type mechanism reached the paper.

It has been stated that the member 15 of the clutch is positively stopped by means of the engagement of the projections 42 and 44. It may be here remarked that means are also provided for preventing any backward movement or rebound of this member, the construction being such that the member is securely locked after each operation. While any suitable means may be employed for this purpose, in the construction shown the driver and the slide-bar 45 are so shaped as to effect it. While the shape of these parts may be varied to produce the result referred to, the bar 45 will preferably have one of its sides, as 46, slabbed off or made straight, said side coöperating with the straight side 19 of the driver 18. After the bar 45 has been moved forward by the driver it will be returned by mechanism to be hereinafter described, and its flat side 46 will engage the flat side 19 of the driver, thus locking the driver against backward movement.

The actuating mechanism, which is operated by the driver and the bar 45, may be widely varied in construction, though it will preferably be normally stationary. In the machine shown a bar 48 is provided, said bar being supported on legs 49, secured to a rock-shaft 50, journaled in suitable bearings on the base 1. The actuating-bar 48 is thus given a rocking movement, which is an exceedingly effective one for the purpose for which the bar is designed. It may be here remarked, however, that the bar might be arranged to be given a movement other than a rocking movement, if desired.

The connection between the shaft 50 and the bar 45, by which it is rocked, may be of any suitable description. As shown, (see Figs. 2 and 5,) the shaft 50 has secured to it an upright arm 51, and to this arm is secured an adjustable plate 52, said plate being provided with slots which are engaged by screws 53. The upper end of this plate 52 carries a stud 54, which is shown as a screw, said stud engaging in a slot in the bar 45. The outer end of the bar 45 bears against a spring 55, which is secured to a projection 56 near the lower end of the arm 51, the tension of the spring 55 being preferably made adjustable by means of a screw 57 or in any other suitable manner. The screw 54 simply maintains the end of the bar 45 through which it passes at the proper height, and the rocking of the shaft 50 is effected through the spring 55. By this construction a slip connection is afforded between the bar 45 and the shaft 50, which prevents breakage should any part of the machine become accidentally locked.

Furthermore, by means of the adjustability of the plate 52 the throw of the shaft 50 is controlled, the amplitude of movement of the actuating-bar 48 depending, of course, upon the distance of the bar 45 from the axis of the shaft 50.

The shaft 50, the actuating-bar 48, and the slide-bar 45 may be returned after they have been moved by the driver in any suitable manner. As shown, a heavy spring 58 is provided for this purpose, said spring being secured at one end to the frame 7 and at its other end to a part 117, which will be hereinafter described, which is connected to the actuating-bar.

The end of the bar 45 which is acted upon by the driver may be supported in any suitable manner. Preferably, however, a bent lever 59 60 is provided for this purpose, said lever being pivoted at 61 to ears rising from the base-plate of the machine. This lever not only supports the inner end of the bar, but also operates to limit the return movement of the bar produced by the spring 58, before referred to. To this end an adjustable stop in the form of a screw 62 is provided, which passes loosely through the arm 60 of the lever 59 60, a felt or leather washer 62 being preferably interposed between the head of the screw and the arm of the lever. This stop prevents the bar from hammering the driver on its return movement and may also control the position of the actuating-bar 48, the screw 62 being preferably so adjusted that the end of the bar 45 is close to but not quite in contact with the face of the driver. While this construction is an exceedingly effective one for the purpose, it will be understood, however, that other constructions may be substituted therefor, if desired.

The normally stationary actuating-bar 48 operates when moved by the driver through the bar 45 to produce the movement of the type mechanism and the spacing mechanism. The mechanism by which the actuating-bar or other form of actuating mechanism effects the operation of the type mechanism may be varied within wide limits. Preferably, however, it includes (see Figs. 7 and 8) a series of locking devices which in the construction shown consist of bell-crank levers 64 65, the arms 65 of these levers being provided with shoulders 66, with which the actuating-bar 48 engages when the levers are operated. Each bell-crank lever 64 65 is carried in the construction shown by a lever 67, these levers having forked lower ends which straddle the shaft 50, the levers 64 65 being pivoted to the levers 67 at 68 or being secured to them in any other suitable manner.

The engagement of the levers 64 65 with the actuating-bar 48 is effected by means of the key-levers, which may be variously constructed and arranged to effect this movement. As shown, each of the key-levers consists of a bent lever 69, which is provided with a recess 70, which takes around the shaft 50, before referred to, the levers being held in position on the shaft by means of a bar 71, which passes through a slot 72 in each key-lever. The upper end of each lever 69 is provided with a head 73, which takes behind the arm 64 of a lever 64 65. As a key-lever is depressed, therefore, it will be seen (see Figs. 7 and 8) that its corresponding lever 64 65 will be thrown down so that the shoulder 66 engages the bar 48. The levers 64 65 are held out of engagement with the bar 48 by means of springs 74, which are secured to the levers and to a bar 75, extending across over the key-levers. The return movement of the levers 64 65, produced by the springs 74, is limited, and their engagement with the bar 48 is insured on their forward movement by means of a suitable guide, which, as shown, consists of a bar 76, extending across the machine, said bar being provided with two loose sleeves 77, one on each side of the machine. It may be here remarked that the shoulders on the arms 65 are so formed as to engage the bar 48 on one side only, the levers being free to move forward independently of the bar. The purpose of this construction will be hereinafter stated.

It is desirable to provide means which will insure that the levers 67 remain stationary when the levers 64 65 are operated by the head 73 of the key-levers, and it is necessary in the present machine that these means be of such a character as to permit each of the levers 67 to partake of the movement of the actuating-bar, which takes place as soon as a lever 64 65 is locked to the bar. A yielding stop is accordingly provided for this purpose. While the details of construction of this stop may be varied, as shown, there is provided (see Figs. 5, 7, and 8) an arm 78, which is located centrally of the machine. It may be here remarked that the levers 67 are arranged in two sets, one on each side of the machine, and the arm 78 is between these two sets. This arm 78 carries a bar 79, which extends each way from the arm, and the arm has connected to it a spring 80, the other end of which is secured to any immovable part of the machine—as, for instance, a bracket 81, rising from the base thereof. The spring 80 is sufficiently strong so that the blows of the key-levers against the arms 64 of the levers 64 65 will not affect it; but it will yield to permit any lever 67 to move forward when the lever is locked to the actuating-bar.

The intermediate connections by which the actuating mechanism produces the operation of the type mechanism may be varied widely and will vary according to the style or type of machine in which the invention is embodied. In the Blickensderfer type of machine the printing characters are carried on a wheel, which is rotated to bring into position the proper character to be impressed upon the paper, after which the wheel is given a movement toward the paper to effect the printing. In the present machine the type-wheel 82

(see Figs. 11 and 12) is mounted on a vertical rod 83, which is mounted in a support 84, carried on a shaft 85, extending across the machine, this shaft being known as the "action" shaft. The rod 83 serves to support a pinion 86, to the hub of which is secured the stopping-ratchet 87 and the notched positioning-wheel 88, these parts being in turn secured to the type-wheel by means of a bent pin 89. The shaft 85 is supported (see Fig. 5) in bearings 90, carried on the top plate 3 of the frame. This shaft 85 supports a pair of sleeves 91, one on each side of the machine. Each of these sleeves 91 carries a sector 92, said sectors being provided with teeth which engage the pinion 86 on opposite sides. It will be understood that part of the key-levers operate upon one of the sectors 92 through its sleeve 91 and suitable connections, and the remainder of the key-levers operate upon the other sector 92 through its sleeve 91 and suitable connections. In the operation of the machine the sector on the side on which a key-lever is struck operates to turn the type-wheel to position the character, after which both sectors and the wheel move forward to make the printing impression. The extent of movement of the wheel about its axis is determined by a stop-pawl 93, which is carried on a bar or bail 94, which extends across the machine, said bail being lifted by proper mechanism to cause the stop-pawl 93 to strike a tooth of the stopping-ratchet 87, and thus stop the type-wheel at the proper time, after which, as has been stated, both sectors and the wheel move forward together. The mechanism which has just been described is a well-known mechanism in machines of this class, and other means for positioning the type-wheel and causing it to receive its printing movement may be substituted for it.

The sleeves 91 (see Figs. 5, 7, and 8) are operated by a series of graduated tumblers 95, one of these tumblers being provided for each key-lever, a part of the tumblers being arranged on one of the sleeves 91 and the remainder on the other sleeve. As in Patent No. 656,085, each of the tumblers may be locked to its sleeve 91, each sleeve being provided with a flattened side and a projection 96. Each tumbler is further provided with an opening, which is somewhat wider than the sleeve and its projection, and with a notch 97, which may be engaged by the projection 96. As in the machine of the patent referred to, each tumbler is provided with teeth 98, said teeth being engaged by teeth 99, formed on the levers 67, before referred to. In the patent referred to, however, the tumblers were all substantial counterparts of each other—that is, they had the same number of teeth, and these teeth were on the same pitch-diameter. In the present machine, however, the gear-teeth on the tumblers are formed on differnt pitch-diameters. This will appear from an inspection of Figs. 9 and 10, wherein are shown two of the tumblers, together with their operating-levers. The tumbler having its teeth arranged on the greater pitch diameter produces only a very slight movement of the type-wheel on its axis in order to bring the type-wheel into printing position, whereas the tumbler having its teeth on the lesser pitch diameter gives the type-wheel a greater movement on its axis to bring the type-wheel into printing position. In the old construction where the pitch-diameters of the tumblers were the same the movement given each sleeve 91 by any of the tumblers was always the same, and consequently the movement given the sector attached to the sleeve was the same. It is evident, however, that the sector must travel a greater distance when the type-wheel, for instance, is to be turned half-way around, or nearly so, in order to bring a letter into printing position, than when the type-wheel is only given a very slight movement. In the former machine all the tumblers were constructed in such a way that each of them would tend to give its sector a movement equal to the greatest movement, this tendency being overcome, however, by the engagement of the stop-pawl with the stopping-ratchet. Where a character was to be printed, therefore, which only required a slight movement of the type-wheel to bring it into position, there was a strain on the operating parts, because the tumbler tried to advance the sector through a greater distance than the stopping mechanism would permit. When the tumbler was checked in its movement, it of course checked the movement of its operating-lever 67, and inasmuch as this lever was locked by the locking bell-crank to the actuating-bar the movement of the actuating-bar was checked. As a result, therefore, it was found that the safety-spring construction in the old machine corresponding to the spring 55 was in constant operation except for the characters which required the greatest axial movement of the type-wheel. By varying the pitch-line of the tumblers the movement of the sector required to position each character can be readily obtained and the strain before referred to is obviated. In the present construction the main purpose of the safety-spring is to permit a yielding action should two locking-levers which control the operation of two tumblers of different pitch be simultaneously thrown into locking engagement with with the bail, as will be hereinafter explained. It will of course be understood that with a machine divided into two parts, as is the case with the one which has been selected to embody the invention, the tumblers on each side of the machine correspond—that is to say, there are fourteen tumblers on one side of the machine having varying pitch-lines and fourteen tumblers on the other side of the machine having corresponding pitch-lines.

When a lever 67 is operated by the actuating mechanism therefor, it first slides the tumbler with which it coöperates with respect to the sleeve 91 so that the locking projection 96 of the sleeve engages the notch 97 of the tumbler, after which the tumbler and sleeve turn together. When a lever 67 returns after operating its tumbler, it carries its tumbler back to the normal position. As the tumbler reaches this position a shoulder 95' thereon strikes a stop, which may be in the form of a plate 97', carried on the top plate 3. (See Figs. 7 to 10.) As the top of the sleeve is at this time in contact with the top of the opening in the tumbler the plate 97' limits the return movement of the tumblers and the sleeves, and consequently of the sectors 92, carried by the sleeves. As the sectors are in engagement with the pinion 86, this stopping mechanism acts not only to lock the tumblers, but also the entire type mechanism, against further backward movement. Each of the tumblers is further provided with a graduated projection 100, which takes under the bail 94, which carries the stop-pawl 93. In the machine shown in Patent No. 656,068 these graduated projections 100 have plane faces. It was found, however, in practical operation that when the stop-pawl engaged the stopping-ratchet there was a recoil or rebound, which tended to slide the tumbler backward on the sleeve and release the locking projection 96 from the notch 97. According to the present invention, therefore, those of the tumblers which are given a considerable amount of movement in order to move the type-wheel are provided with locking projections 101, which bear against the outer side of the bail 94. The movement of the tumblers with respect to the locking projections 96 of the sleeves 91 is very slight in practice, not being more than a sixteenth of an inch, though it is exaggerated in the drawings in order to make the operation clear. In printing certain characters—as, for instance, the letter "e," which is most constantly used— the type-wheel is only given a very slight degree of movement about its center. Consequently the movement of the sector and the sleeve by which it is operated is only very slight, and the graduated tumbler-face 100 of that tumbler which effects the movement of the sector lies close to the under side of the bail 94, which carries the stopping-pawl, so that the stopping-pawl may be immediately thrown up to be struck by the proper tooth on the stopping-ratchet. Inasmuch as the tumbler slides toward the bail, in order to lock, the locking projection is only advantageous on those tumblers which have their graduated faces a distance from the plane in which the under side of the bail lies equal to or greater than the height of the locking projection. Furthermore, the locking projections are not necessary where the type-wheel is only given a slight movement about its center, because the rebound is not sufficient to tend to displace the tumblers.

With the mechanism so far described it will be seen that by depressing a key-lever 69 its head 73 will strike the arm 64 of the locking-lever 64 65 and force its shoulder 66 down into engagement with the bar 48, this action being assisted by the guide 76 77. When the shoulder 66 on the lever 64 65 has become engaged with the actuating-bar 48, the segment-lever 67 is locked to the bar 48, and the movement of the bar by the power mechanism will result in an actuation of the segment-lever 67, the key-lever of which has been operated, the tumbler, the sleeve, the sector, and the actuating-bar. In order to produce a movement of the locking-bail, it is necessary to release the clutch mechanism, thus permitting the driver to make a revolution, the driver operating to move the slide-bar 45 and rock the shaft 50, which carries the actuating-bar.

The release of the clutch mechanism is effected by the action of the particular key-lever which has been struck in order to connect a locking-lever to the actuating-bar. The means by which the several key-levers effect the release of the clutch mechanism may be varied widely. In the present machine the release of the clutch is effected by moving the slide-bar 29, which in turn operates the controller-lever 25, the movement of which permits the two members of the clutch to engage. In the machine disclosed in Patent No. 656,085, before referred to, the release of the clutch was effected by moving a slide-bar which operated the controller, and the movement of the slide-bar was effected by means of a rock-shaft. In that machine two sets of locking devices were provided, one for locking one of the sectors and the other for locking the other sector. A part of the key-levers operated upon one set of locking devices and a part of the key-levers upon the other set, and the locking devices in turn operated the rock-shaft by which the clutch-controller was actuated.

In the machine which forms the subject of this application the locking devices referred to are eliminated and the key-levers operate directly on a member which in turn operates the clutch-controller. The construction by which in the present machine the keys effect the actuation of the clutch-controller may be varied within wide limits. As shown, however, there is provided an operating member which is common to all the keys and which is engaged by each of them, this operating member consisting of a rock-shaft 102, (see Figs. 7, 8, 14, and 18,) provided with an operating-rib 103, said shaft being suitably supported in the frame of the machine. The head 73 of each lever 69 is provided with a shoulder 104, which is normally in engagement with the rib 103, a back-stop rod 105 being provided which limits the backward movement of the key-levers, and thus properly positions them so that their shoulders engage the rib. The position of the parts when the key-levers are in inoperative position is shown in Fig.

7. The rock-shaft 102 carries on one of its ends (see Fig. 2) an arm 106, to which the upwardly-bent end of the slide-bar 29 is pivoted. When a key-lever is depressed, therefore, its shoulder will engage the rib 103 of the shaft 102 and rock the shaft, the movement of the shaft causing in turn a movement of the slide-bar 29. When the slide-bar 29 moves, the controller 25 is rocked and its cam 27 withdrawn from between the members of the clutch, allowing them to engage. The driver then makes its revolution, causing through the means described the movement of the actuating bar, which in turn, through the connections which have already been described, operates to position the type-wheel and cause it to make its printing movement.

It has been before stated that the teeth of both the sectors 92 are in engagement with the pinion 86, which rotates the type-wheel. When a key is struck, therefore, the sector on that side of the machine on which the key is rotated by the proper tumbler and segment-lever and this rotation continues until the graduated face of the tumbler has raised the locking-bail to a position where the stop-pawl 93 strikes the proper tooth on the stopping-ratchet, after which both sectors move forward until the wheel has impressed the type upon the paper.

It has been found by practical experience that the best results are produced where the type-wheel is caused to strike the paper by the momentum which it and its related parts acquire in their forward movement. For this reason the locking-levers 64 65 are formed, as has been before stated, to leave a free space behind the actuating-bar, so that the levers can move forward independently of the bar. The machine is therefore so adjusted that the movement of the actuating-bar is not quite sufficient to throw the type-wheel against the paper. The movement of the actuating-bar is exceedingly rapid and the momentum of the parts operated by it is sufficient to cause the type-wheel to move onward and strike the paper after the bar ceases its movement, the arms 65 sliding with respect to the bar. This produces a tapping blow or movement which is particularly desirable, especially in manifolding.

The fact that the locking-levers 64 65 have a shoulder on the front side of the actuating-bar, so as to leave a free space behind the bar, is also important in case, through an accident or for any other reason, two locking-levers are thrown into engagement with the bar at the same time. Should this occur, it will be apparent that the tumbler whose graduated face lies nearer to the under side of the bail will operate to throw the stopping-pawl into position and check the movement of the sector with relation to the pinion which turns the type-wheel. The tumblers which have their graduated faces nearest to the under side of the bail, however, are those which are constructed with the greater pitch-diameter. It will be apparent that if two tumblers having different pitch-lines are locked to the actuating-bar at the same time the tumbler having the pitch-line of lesser diameter will tend to move the sleeve and the sector attached thereto faster than the other sector. Consequently the tumbler having the lesser pitch-diameter will drive the sleeve and the other tumbler instead of driving the sleeve will be driven by it. The result of this will be that the segment-lever 67 of that tumbler will be driven by its tumbler instead of driving it, and since the pitch-diameter of the tumbler which is driving its segment-lever 67 is greater than the pitch-diameter of the tumbler which is driven by its lever 67 the lever 67 of the tumbler which is being driven by the sleeve will move forward faster than the other segment-lever. The free space behind the shoulders of the levers 64 65 permits such a movement of the segment-levers when necessary, and through the operation of the spring 55 undue strain is avoided.

As the type-wheel moves toward the paper, due to the operation first of one of the sectors, and consequently to the turning of the action-shaft, the positioning-wheel 88 before referred to as mounted on the pinion 86, by which the type-wheel is rotated, strikes a stud 107 or other similar centering device, this stud operating to correct any slight irregularity in the position of the type.

As soon as the driver 18 has operated through the slide-bar 45 to push the actuating-bar to its extreme forward position the slide-bar slips off the point of the driver and the spring 58 operates to throw the driver and the actuating-bar back into position. By the time the actuating-bar starts on its return the type-wheel has delivered its blow upon the paper and is returned to position by the reverse movement of the action-shaft, said movement being effected by any suitable means. As shown, there is provided (see Fig. 3) a spring 108, which is secured to an arm 109, extending from the action-shaft and to any suitable point on the frame of the machine. The backward movement of the type-wheel is limited by a suitable stop. As shown, this stop (see Figs. 2, 11, and 12) is an adjustable stop 110, and in order to reduce the noise and prevent hammering this stop is preferably provided with a cushion 112, of leather, rubber, or any other suitable material. This stop is so positioned that it is struck by the backward extremities of the sectors 92.

The blow of the sectors against the stop 110 might displace the type-wheel, so that after being once operated the wheel would not be properly positioned for the next operation. A locking mechanism is accordingly preferably provided for holding the type mechanism against movement away from the stop 110. This locking mechanism may be widely varied in construction. As shown, however, the action-shaft 85 (see Figs. 2 and 23) is provided with an arm 113, which is arranged to contact with a suitable locking projection, which may be constructed, mounted, and operated in any desired manner in order to effect the locking and unlocking. As shown, this locking projection, which is marked 114, extends from a block 115, which is pivoted at 116 on the upper end of a lever 117, which is loosely mounted on the shaft 50. The position of the block 115 is determined by any suitable form of adjustment—as, for instance, by means of an eccentric screw 118. In the construction shown the lever 117 is connected to one of the legs 49 of the actuating-bar 48, the connections being preferably of such a character as to permit a slight play between the parts. As shown, this connection is formed by means of a screw 119, which is also an eccentric screw and which passes through a slot in the lever. The spring 58, which is relied upon in the present machine to return the actuator-bar, is preferably connected to this lever 117. It will be seen, therefore, that as soon as the actuator-bar has completed its forward movement the lever 117 will return, carrying with it the actuator-bar, and the projection 114, in the practical operation of the machine, will be positioned under the arm 113 at the time when the ends of the sectors strike the stop 110. The action-shaft, the type-wheel, and the parts connected therewith are therefore immovably held at the instant when they come to a stop on their return movement, the sectors being locked against movement in one direction, either by the stop 110 or by the contact before described of the shoulders 95' on the tumblers 95, against the stop-plate 97' or by the action of both these devices and against movement in the other direction by the arm 113 and the projection 114. Furthermore, this single locking device 113 114 is released by the operation of the power mechanism.

It will be observed that in this machine a single locking device mounted on the action-shaft operates to lock the sectors on both sides of the machine. In fact, a single operating device is depended on to lock the entire type mechanism against a movement away from the stop 110. The construction is therefore far simpler than the one employed in the machine shown in the patent above referred to, where two locking devices, one on each side of the machine, are employed, and these locking devices released by the key-levers instead of by the power mechanism.

The platen against which the type-wheel operates is mounted on a carriage which may be of any suitable construction. As shown, (see Figs. 1, 2, and 4,) the carriage consists of uprights 120, which are secured to cross-plates 121, which are in turn secured in any suitable manner to rods 122. The uprights 120 serve to support the usual platen-roll 123, and the top of the uprights may support the usual scale 124. The carriage-rods engage guide-wheels 125 126 127. These guide-wheels are preferably arranged so that two of them bear on one of the carriage-rods and the other one on the other rod. As shown, the wheels 125 126 are mounted on studs extending upward from the plate 3, the usual ball or antifriction bearings being provided. The wheel 127, however, is mounted on a stud 128, (see Figs. 1 and 2,) which is carried on a plate 129, adjustably mounted on the plate 3, said plate 129 sliding in guides 130 and being locked in position by suitably-arranged screws. The adjustment of the wheel 127 thus obtained may be used to correct any irregularities in the width of the carriage. The carriage is advanced by spacing mechanism, which may be of any suitable construction. As shown, the carriage is provided with a rack 131, which is engaged by a feeding-pawl 132, said pawl being pivoted to one of the arms 133 of a bell-crank lever 133 134, said lever being pivoted to the top plate of the frame at 135. The arm 134 and the pawl 132 are connected by a spring 136, which serves to hold the pawl in engagement with the rack. A stop-pawl 137 is provided, said pawl being carried on an arm 138, which is pivoted at 139 to the top plate of the machine and is provided with a spring 140, which holds the stop-pawl normally in engagement. The forward movement of the feeding-pawl 132 is limited by a cam-stop 141, suitably secured to the top plate of the machine.

The movement of the bell-crank lever 133 134, by which the feeding is effected, may be accomplished in any suitable manner. As shown, there is provided a space-plate 142, (see Figs. 1, 3, 4, and 5,) which is mounted to slide in suitable guides on the under side of the top plate 3. The plate is provided with an arm 143, which carries a stud 144, (see Figs. 3 and 4,) which extends upwardly through a slot in the top plate 3 and into a slot in the arm 134. It is apparent that as the space-plate is moved forward and backward the bell-crank lever 133 134 will be moved and the pawl 132 will effect the feeding of the carriage.

The movements of the space-plate may be effected in any suitable or desired manner. Preferably, however, the mechanism which effects the operation of this plate will be of such a character that the space-plate may be moved by the spacer through suitable mechanism or by the type mechanism through suitable mechanism or both the type mechanism and the spacing mechanism when operated simultaneously, the spacer in this case operating to produce spaces of increased length. In the construction shown (see Figs. 3, 5, and 14 to 18) the space-plate 142 is provided with a projection 145, which consists of an arm rigidly connected thereto. This arm carries an operating member, which in the construction shown consists of a lever 146 147, centrally pivoted, as at 148, to the projection 145. It is obvious that if power be applied to either end of the operating member or lever and the other end be held stationary, so as to act as a fulcrum, the space-plate will be moved, and since the arms of the lever are of substantially the same length the movement produced by operating on either end of the lever and using the other end as a fulcrum will be substantially the same. It will be further obvious that if power is applied to both ends of the lever simultaneously the lever will be bodily advanced instead of being given a pivotal movement, and its central point will move twice the distance that it does when either end of the lever is operated alone against the other end as a fulcrum.

In the machine shown the construction is so arranged that the type mechanism when it operates acts upon one end of the lever, the spacer operates upon the other end of the lever, and the spacer and type mechanism may operate together upon both ends of the lever.

The means by which the type mechanism operates the space-plate-operating member may be of any suitable description. As shown, the action-shaft 85 is provided with an arm 149, having a pin 150, which lies behind the end 146 of the operating member. The end 147 of the operating member is provided with a slot or recess which takes over a pin 151, mounted on a spacing-lever 152, said lever being mounted in line with and being similar in shape to the segment-levers 67. This lever 152 carries one of the locking bell-crank levers 64 65, by which it is secured to the actuating-bar 48 when the space-plate is to be operated from the spacer and is held back against a stop-pin 153 by means of the spring-mounted stop-bar 79, before described. The stop-pin 153 is mounted on one of a series of cam-plates 154, which are used to space the tumblers and the segment-levers. When a key-lever is struck and the action-shaft 85 operated through the chain of connections which have been described to cause the type-wheel to print, the arm 149 is swung and the pin 150 bears against the end 146 of the lever 146 147, the pin 151 during this operation acting as a fulcrum. It will be seen, therefore, that the movement of the action-shaft 85 will rock the lever 146 147 and will advance the space-plate 142 through the arm 145 a sufficient distance to cause the feeding-pawl to advance the carriage a sufficient amount to make a space for the next character.

In order to operate the lever 146 147 to effect a spacing movement of the carriage when a key is not struck, there is provided a spacer, which may be of any desired construction. As shown, it consists of a U-shaped bar 155, pivoted to both sides of the base-plate of the machine at 156. At one side this bar is provided with a forwardly-projecting arm 157, which carries a roller 158, mounted in adjustable plates 159, secured to the arm by screws or in any other suitable manner. The roller 158 bears against a cam-shaped end 160 of a lever 161, which has an enlarged head 162 and shoulder 163, the head and shoulder being identical in construction and function with the heads 73 of the key-levers—that is to say, the forward end of its head bears against the arm 64 of its bell-crank 64 65 and the shoulder 163 engages the rib 103 on the clutch-releasing rock-shaft 102. This lever 161 is pivoted on the shaft 50, before referred to, and is held in position by the bar 71, which holds the key-levers. When the space-bar is operated, therefore, the lever 161 is thrown forward and its head rocks the bell-crank lever 64 65 and locks the lever 152 to the actuator-bar 48, the clutch being at the same time released by the movement of the shaft 102, and the action-shaft being at this time stationary as the lever 152 is pulled forward by the actuator-bar it causes the space-plate-actuating member 146 147 to operate the space-plate, said member turning on the pin 150 as a pivot, the lever 152 acting on said member through the pin 151. The pin 150 and the pin 151 are substantially the same distance from the pivotal point 148 of the actuating-lever 146 147. It follows, therefore, that the movement of the center of the lever 146 147 is the same irrespective of the end to which the power is applied. In other words, the operation of the spacer and the operation of the type mechanism alone produces spaces of the ordinary length.

When it is desired to space and imprint a character simultaneously—as, for instance, when the final letter of a word is printed and it is desired to space that word from the next word—both the spacer and the letter are struck simultaneously. The pin 150, connected with the action-shaft, now operates on the end 146 of the operating member, and the pin 151 simultaneously operates on the end 147. As a result, therefore, of the simultaneous operation of a key-lever and the spacer the member 146 147 instead of being given a pivotal movement on its center is advanced bodily by power applied at both ends. This gives the center of the lever a movement which is twice as great as it is given when it is operated at either of its ends alone. This increased movement of the center of the operating member is transmitted through the connections to the space-plate, and the spacing-pawl is operated to give the carriage twice the movement which is given it when either the spacer or the type mechanism operates it. It may be here remarked that in the construction shown the operating member simply draws the spacing-pawl back, and therefore governs the length of take of the pawl.

The forward movement of the pawl is produced by the return movement of the space-plate 142, and this return movement may be effected in any suitable manner. As shown, there is provided (see Figs. 1 and 4) a spring-controlled lever 164, which is pivoted at 165 to the under side of the plate 3, said lever engaging a pin 166 on the under side of the space-plate.

After a line has been printed the carriage must of course be returned, so that a new line may be begun. The return of the carriage may be effected either manually or by any suitable mechanism. As shown, the carriage is returned by means of the power mechanism, and the connections are also preferably so arranged that the power mechanism feeds the carriage in either direction. The details of construction of these connections may be varied within wide limits. As shown, the carriage is provided with a rack 167, (see Figs. 1 and 4,) which is engaged by pinion 168, which is mounted on an upright shaft 169. This pinion is in continuous engagement with the rack. The shaft 169 is mounted in a housing or standard 170, (see Figs. 3 and 4,) said housing being secured at its upper end to the frame in any suitable manner, as by screws 171, and at its lower end by a screw 172 and a suitable dowel-pin 173, which passes through the lower part of the housing and into a perforation in the base-plate of the frame. The shaft 169 carries on its lower end a gear 174, which is in engagement with two gears 175 176, said gears being located on the opposite side of the center of rotation of the gear 174, and consequently operate to turn it in opposite directions. The gears 175 176 are loosely mounted on a rod or stationary shaft 177, this shaft being carried by a suitable support 178, which is held in position by the dowel-pin 173, before referred to, said pin entering a socket in the support. The support is therefore so mounted that it can receive a pivotal movement around the dowel as a center. The gear 176 has secured to it a friction-wheel 179, and the gear 175 has secured to it a friction-wheel 180, the wheel 180 being preferably of less diameter than the wheel 179. It is apparent that by turning the wheel 179 the shaft 169 and the gear 168 will be given a movement which in turn will give the carriage a movement in one direction, and by turning the wheel 180 in the same direction the movement of the shaft 169, the gear 168, and the carriage will be reversed.

The wheels 179 180 are driven from the power mechanism. The connections by which they are driven may be of any suitable character. As shown, the motor-shaft 5 (see Figs. 1 and 3) is provided with friction driving-wheels 181 182, the wheel 181 being larger in diameter than the wheel 182. The wheel 181 is so located that it may be engaged by the wheel 180, and the wheel 182 is so located that it may be engaged by the wheel 179. The engagement between the wheels 180 and 181 and the wheels 179 and 182 is effected by giving the support 178 a pivotal or swinging movement. This may be accomplished in any suitable manner and is preferably effected by means of suitable keys which are provided for this purpose. In the construction shown (see Figs. 3 and 22) the support 178 is provided with a projection 183, to which is secured a plate 184. This plate is provided with a notch, the sides 185 186 of which are at an angle to each other. This notch 185 186 is arranged to be engaged by the ends of two key-levers, (see Figs. 1, 3, and 22,) these key-levers being marked, respectively, 187 and 188. The lever 187 operates in connection with the cam side 186 of the notch, and the lever 188 operates in connection with the cam side 185 of the notch, and it is apparent that these levers 187 188, which are pivoted to bearings in the frame at 189, will serve to turn the support in opposite directions. When the lever 187 is operated, the wheel 180 is thrown into engagement with the wheel 181, and the carriage is given its return movement or that movement which takes place after a line has been printed. When the lever 188 is operated, the support 178 will be swung in the opposite direction and the wheel 179 will be thrown into engagement with the wheel 182. This will drive the carriage forward, but at a speed considerably less than the speed at which the carriage is returned. This mechanism for moving the carriage is utilized when it is desired to give the carriage a forward movement of considerable extent and to do this more rapidly than can be done by operating the spacer alone.

Of course it will be understood that before the carriage can be driven either backward or forward by the mechanism which has just been described the spacing-pawls must be released from the rack on the carriage. The mechanism by which this is effected may be of any suitable description. As shown, however, (see Figs. 1, 3, and 4,) there is provided a hub 190, which is mounted on the pivot 189, which supports the levers 187 and 188. This hub has extending horizontally from it an angular arm 191, the end of this arm underlying the levers 187 188 in position to be struck by them when they are operated. The end of this arm is provided with a small guide-plate 102, which guides the levers in their movement. The hub 190 has also connected to it a curved arm 193, the upper end of said arm engaging a bracket 194, which is secured to the space-plate 142. It is apparent, therefore, that when either the lever 187 or the lever 188 is operated the space-plate will be actuated and will withdraw the spacing-pawls from the rack on the carriage, thus leaving the carriage free to be driven in either direction. The movement given the space-plate by the arm 193 is greater than the movement given it during the ordinary spacing operation, so that both the advancing and stop pawls are moved clear of the rack.

It may sometimes be desirable to move the carriage manually, and in order to effect this it is necessary to render the spacing mechanism inoperative. While this may be done by any desired means, in the construction shown two instrumentalities are preferably provided for this purpose. One of these instrumentalities embodies a key-lever 195, which is also mounted on the pivot 189 and which overlies and operates the arm 191. The end of this lever (see Fig. 22) is caused to project beyond the pivot and engages a slot 196 in the plate 184. This slot or notch 196 is so arranged that when the lever engages it the support 178 is locked in its central position, so that neither of the wheels 179 180 can engage the wheels on the power-shaft.

Should it be desired to have the carriage free of the spacing mechanism for any considerable length of time, as may be the case when the underscoring device to be hereinafter referred to is employed, a lock of any suitable construction may be provided for the lever 195. In the construction shown this lock consists of a lever 197, (see Fig. 3,) which is pivoted to the frame of the machine, this lever having a notch 198, which engages a pin 199 on the lever 195. The lever 195, as will appear from the plan view, Fig. 1, is located in proximity to the key-levers, so that the spacing mechanism for the carriage may be released when desired without compelling the operator to remove his hands from the keyboard.

The other instrumentality by which the spacing mechanism for the carriage is released is located in close proximity to the carriage itself, and in the construction shown consists (see Figs. 1 and 3) of a two-armed lever 200 201, said lever being pivoted on a pin 202, which is one of the pins which supports the action-shaft 85. The arm 201 of the lever takes behind a projection 203, extending upwardly from the space-plate, and the arm 200 is broadened, so that it may be operated by the thumb or finger. It is apparent that by pressing upward on the lever 200 the space-plate will be moved and through the connections before described will move the spacing-pawls, throwing them out of engagement with the rack on the carriage.

When a type-writing machine of the character described is being rapidly operated, the operator is liable to strike a key or keys after the end of the line has been reached, so that characters are piled up or printed over each other. Means are preferably provided to prevent this piling up of characters, and in the construction shown these means operate to lock the connections between the keys and the power mechanism. The specific construction by which this function is accomplished may be widely varied. As shown, the carriage is provided (see Figs. 1, 3, and 6) with a shaft a rod 204, pivoted in suitable bearings in the ends of the carriage. This rod serves to support a stop 205, which is adjustably mounted thereon. A torsion-spring 206 is or may be provided, which serves to hold the rod so that the stop 205 may be in normally operative position, and a handle 207 is attached to the rod by which the shaft may be turned when it is desired to render the stop inoperative. The stop 205 is arranged to contact at the end of the movement of the carriage with a projection 208, which is formed on or secured to a sliding bar 209, which is supported on the top of the plate 3. This bar, in the construction shown is provided with slots which are engaged by screws 210, said screws permitting a movement of the bar, and the bar is held back against the screws by means of a suitable spring 211. The end of the bar opposite that which carries the projection 208 is provided with a hook or finger 212, which is arranged to engage a finger 213, (see Figs. 1 and 2,) which is secured to the clutch-releasing shaft 102. When the margin-stop 205 strikes the projection 208, it gives the bar 209 a lengthwise movement, causing the hook 212 to engage the finger 213. Should a key-lever be now struck, its shoulder 104 cannot turn the shaft 102 because of the engagement of the finger 213 with the hook 212. The clutch, therefore, cannot be released and the machine cannot be operated until the stop 205 has been moved out of engagement with the projection 208.

The type-carrier in the present machine, as has been before indicated, consists of a wheel 82, and it has been heretofore stated that this wheel is mounted on a rod 83, which is carried by a support 84, mounted on the action-shaft. This type-carrier has the type arranged in three circumferential rows, one of said rows consisting of the small letters, the second row consisting of the capitals, and the third row consisting of the figures, the punctuation-marks being distributed among the three rows as desired. When it is desired to print a character which is on the second or third row, it will be necessary to give the type-wheel a lengthwise movement with respect to its axis of rotation in order to properly position the row. This lengthwise movement may be effected by any suitable mechanism. As shown, however, there is provided a bent lever 214, (see Figs. 2, 11, 12, and 13,) said lever being pivoted at 215 to an arm 216, which extends downward from the front of the top plate 3. The lever 214 has its end located in position to engage a projection or pin 217, which extends through a slot 218 in the support 84, before described. When the bent lever is actuated, it will raise the rod 83, the amount of lift given the rod depending upon the amount of movement given to the bent lever, and since the pivotal point of the lever is below the end of the rod the end of the rod as it swings moves away from the lever, thus preventing binding. This bent lever may be actuated in any desired manner. As shown, there is pivoted to it at 219 a link 220, which is pivoted to an arm 221, which extends from a U-shaped frame 222, (see Figs. 5, 11, and 12,) which is swung on the shaft 50, before described. This U-shaped frame has a projection 223, (indicated in dotted lines in Figs. 11 and 12 and shown in full lines in Fig. 2,) and this projection is provided with two adjustable operating-pieces of different lengths, said pieces consisting, as shown, of screws 224 225. These adjustable operating pieces or screws lie in the path of two key-levers 226 227, one of which operates in connection with the long operating-screw and the other in connection with the short operating-screw. The downward movement of these levers is controlled by means of stops 228 229. (See Fig. 1.) When one or the other of the levers 226 227 is operated, the U-shaped frame will be given a movement corresponding to the movement of the lever and the arm 214 through the connections described will be lifted to bring either the second or third row of characters into proper position.

In order to prevent any longitudinal movement of the type-wheel except when it is desired to position the different rows of type and in order to insure that the wheel remains in the position to which it has been adjusted, a suitable locking device is employed. In the construction shown this locking device consists of a plate 230, provided with notches 231, 232, and 233. This locking-plate is in the form of a lever loosely swung on the action-shaft 85 and is provided with a projection 234, which engages beneath a stop 235 when the type-wheel is in its rearward position. The end of the plate 230 has connected to it a spring 236, the other end of the spring being connected to a pin which is mounted on the support 84, the tendency of the spring being to draw the plate or lever toward the support. After the type-wheel has been shifted longitudinally by the lever 214 and the proper key has been struck as the wheel swings by reason of the movement of the action-shaft toward the platen the pin 217 engages the proper notch in the lever and the lever moves back with the action-shaft. The position of the parts with the locking device in and out of engagement is clearly shown in Figs. 11 and 12. It will be noticed that the pivotal point 215 of the lever 214 is situated below the end of the type-wheel support 84 and to one side of it, so that the end of the support when it is swung travels toward the center. By this construction as soon as the lever 217 has been operated and the type-wheel support has been swung sufficiently to engage one of the notches in the lever or plate 230 the further movement of the support carries its end, or rather the projection 217 on the rod 218, away from the lever, thus preventing any binding or rubbing action between the lever and projection.

Any suitable form of inking mechanism may be employed with the type-carrier. Preferably, however, the ink will be applied to the type on the type-wheel by means of a rotary ink-pad 237. This pad may be mounted and operated in any desired manner. As shown, it is mounted in a bent lever 238, which is pivoted at 239 to a bracket 240, the lever being held against the bracket by means of a spring 241. The position of the lever 238 when the type-carrier is in inoperative position is shown in Fig. 7, and the position of the parts after the carrier has moved forward and had the ink applied to it and moved the ink-pad out of the way is shown in Fig. 8. It is desirable to have the ink-pad so mounted that it may be thrown back clear of the carriage, so that a worn pad may be readily replaced or for other reasons. In the machine shown, therefore, the bracket 240 is mounted on a swinging bracket 242, consisting of arms which in the present machine are pivoted to frames 243 244, though it might be otherwise located. The support 242 may be locked in position in any suitable manner, as by a pin 245, (see Figs. 2 and 6,) which passes through the frame 244 and engages one of the arms of the bracket.

In order that the operator may readily locate the point of impression of any particular type, so as to be able to make corrections or for other purposes, a suitable indicator is provided. In the construction shown this indicator consists of a sliding bar 246, which in the present machine is secured to the frame 244 by means of screws 247 or in any other suitable manner. This indicator is held in a normally inoperative position by means of a spring 248 and is or may be provided with an adjustable stop which limits its forward movement. In the construction shown this stop consists of a screw 249, which passes through the bent end of the bar 246. The inner end of the bar 246 is provided with an indicating-finger 250, which when the device is properly adjusted will when the slide-bar is moved forward indicate the point of impression or the point to which the carriage must be moved in order to cause a type to make its impression at the point on the paper desired. In order to prevent the view of the operator from being obstructed by the ink-pad, the slide-bar is also preferably provided with means for moving the ink-pad out of the way. In the construction shown these means consist (see Figs. 5 and 6) of a bent arm 251, which takes under the lever 238 and swings it back against the stress of its spring 241. While the spring 248 is intended to return the slide-bar when the bar is released by the operator, it may happen that the operator will strike a key with one hand while holding the indicator-bar with the other. As this would cause the type-wheel to strike the indicator-bar and injure the type thereon, means are preferably provided for insuring that the indicator be moved out of the way. In the construction shown these means consist of an arm 252, mounted on the action-shaft, said arm being arranged to strike a cam-plate 253, which (see Fig. 5) is pivoted to the inside of the frame 244. This cam-plate is in turn arranged to strike a downward projection 254 on the slide-bar and move it back. Should the operator strike a key, therefore, while holding the slide-bar forward, the arm 252 will swing the cam-plate 253 and move the slide-bar back positively, even though the operator is trying to hold it forward.

The frame 243, as shown, is provided with underscoring-wheels 255. As the construction and operation of these devices are well known, however, a description of them is unnecessary.

While the specific construction which has been hereinbefore described, and illustrated in the accompanying drawings, is an efficient one for carrying the invention into effect, it is to be understood that the invention may be embodied in mechanism which varies widely from that which has been described. The invention is not, therefore, to be limited to the specific details of construction hereinbefore set forth.

What is claimed is—

1. The combination with a type mechanism, of a power mechanism, key-controlled operating mechanism between the power mechanism and the type mechanism, means for holding the type mechanism against movement in one direction, a single locking mechanism for holding the type mechanism against movement in the opposite direction, releasing means for said locking mechanism, and connections whereby said releasing means is operated when a key is operated, substantially as described.

2. The combination with a type mechanism, of a power mechanism, key-controlled operating mechanism between the power mechanism and the type mechanism, means for holding the type mechanism against movement in one direction, a single locking mechanism acting on the operating mechanism and preventing a movement of the type mechanism in the opposite direction, releasing means for said locking mechanism, and connections whereby said releasing means is operated when a key is operated, substantially as described.

3. The combination with a constantly-running power mechanism, of a type mechanism, a normally inoperative actuating mechanism, key-controlled connecting means between the actuating mechanism and the type mechanism, means for holding the type mechanism against movement in one direction, a single locking mechanism for holding the type mechanism against movement in the opposite direction, releasing means for said locking mechanism, and connections whereby said releasing means is operated when a key is operated, substantially as described.

4. The combination with a constantly-running power mechanism, of a type mechanism, a normally inoperative actuating mechanism, key-controlled connecting means between the actuating mechanism and the type mechanism, means for holding the type mechanism against movement in one direction, a single locking mechanism operating on the connecting means and preventing a movement of the type mechanism in the opposite direction, releasing means for said locking mechanism, and connections whereby said releasing means is operated when a key is operated, substantially as described.

5. The combination with a constantly-running power mechanism, of a type mechanism, a normally inoperative actuating mechanism, a bank of keys, means including locking devices controlled by each of the keys for connecting the type mechanism to the actuating mechanism, means also controlled by each key for causing the power mechanism to operate the actuating mechanism, means for holding the type mechanism against movement in one direction, a single locking mechanism for holding the type mechanism against movement in the opposite direction, releasing means for said locking mechanism, and connections whereby said releasing means is operated when a key is operated, substantially as described.

6. The combination with a constantly-running power mechanism, of a type mechanism, a normally inoperative actuating mechanism, a bank of keys, mechanism including a clutch for connecting the power mechanism to the actuating mechanism, connections including locking devices also controlled by the keys for connecting the actuating mechanism to the type mechanism, means for holding the type mechanism against movement in one direction, a single locking mechanism for holding the type mechanism against movement in the opposite direction, releasing means for said locking mechanism, and connections whereby said releasing means is operated when a key is operated, substantially as described.

7. The combination with a type mechanism, of an operating-shaft therefor, a bank of keys, means whereby each of the keys produces a movement of the shaft, means for holding the shaft against movement in one direction, a locking device carried by the shaft for holding it against movement in the opposite direction, releasing means for said locking device, and connections whereby said releasing means is operated when a key is operated, substantially as described.

8. The combination with a type mechanism, a rock-shaft, connections whereby the rock-shaft operates the type mechanism to produce a printing movement, a bank of keys, means controlled by the keys for rocking the shaft, a locking device carried by the shaft, and releasing means, substantially as described.

9. The combination with a type-carrier, of a support on which it is mounted, an operating rock-shaft for the support, a bank of keys, means controlled by the keys for rocking the shaft, a locking device carried by the shaft, and releasing means, substantially as described.

10. The combination with a type mechanism, of an operating rock-shaft therefor, means including a plurality of tumblers for operating the shaft, a bank of keys, connections whereby each key causes the operation of a tumbler, a locking device carried by the shaft, and releasing means, substantially as described.

11. The combination with a type-carrier, of a support on which it is mounted, an operating rock-shaft for the support, means including a plurality of tumblers for operating the shaft, a stopping device coöperating with the tumblers, a bank of keys, connections whereby each key causes the operation of a tumbler, means for returning the tumblers, a locking device carried by the shaft, and releasing means, substantially as described.

12. The combination with a type mechanism, of an operating rock-shaft therefor, sleeves mounted on the shaft, a plurality of tumblers for operating each sleeve, means whereby each tumbler may be locked to and unlocked from a sleeve, a bank of keys, means whereby each key causes the operation of a tumbler, operating connections between the sleeves and the type mechanism, a locking device carried by the shaft, and releasing means, substantially as described.

13. The combination with a type-carrier, of a support therefor, an operating rock-shaft for the support, sleeves mounted on the shaft, operating connections between the sleeves and the type-carrier, a plurality of tumblers for operating each sleeve, means whereby each tumbler may be locked to and unlocked from a sleeve, a bank of keys, means whereby each key causes the operation of a tumbler, means for returning the tumblers, a stopping device for limiting the return movement of the tumblers and operating to lock the type-carrier against movement in one direction, a locking device carried by the shaft and operating to lock the type-carrier against movement in the opposite direction, and releasing means, substantially as described.

14. The combination with a type-carrier, of a support therefor, an operating rock-shaft for the support, sleeves mounted on the shaft, operating connections between the sleeves and the type-carrier, a plurality of tumblers for operating each sleeve, means whereby each tumbler may be locked to and unlocked from a sleeve, a bank of keys, means whereby each key causes the operation of a tumbler, means for returning the tumblers, a stopping device for limiting the return movement of the tumblers and operating to lock the type-carrier against movement in one direction, a locking device carried by the shaft and operating to lock the type-carrier against movement in the opposite direction, and power-operated releasing means, substantially as described.

15. The combination with a constantly-running power mechanism, of a type mechanism, an operating-shaft therefor, a normally inoperative actuator, a bank of keys, means including locking devices controlled by each of the keys between the actuator and the shaft, means controlled by each of the keys for causing the power mechanism to operate the actuator, a locking device carried by the shaft, and releasing means, substantially as described.

16. The combination with a constantly-running power mechanism, of a type mechanism, an operating-shaft therefor, a normally inoperative actuator, a bank of keys, means including locking devices controlled by each of the keys between the actuator and the shaft, means controlled by each of the keys for causing the power mechanism to operate the actuator, a locking device carried by the shaft, and releasing means operated from the power mechanism, substantially as described.

17. The combination with a constantly-running power mechanism, of a type-carrier, a support therefor, an operating-shaft for the support, a normally inoperative actuator, a bank of keys, means including locking devices controlled by each of the keys between the actuator and the shaft, means controlled by each of the keys for causing the power mechanism to operate the actuator, a locking device carried by the shaft and operating to lock the shaft and type-carrier against movement in one direction, power-operated releasing means for the locking device, and means operating to lock the type-carrier against movement in the opposite direction, substantially as described.

18. The combination with a constantly-running power mechanism, of a type mechanism, a normally inoperative actuating mechanism, a bank of keys, means controlled by each of the keys for causing the power mechanism to operate the actuating mechanism, a single locking device for the type mechanism, and means operated by the power mechanism for positively releasing said locking device, substantially as described.

19. The combination with a constantly-running power mechanism, of a type mechanism, a normally inoperative actuating mechanism, a bank of keys, connections including locking devices controlled by the keys between the type mechanism and the actuating mechanism, connections controlled by each of the keys for causing the power mechanism to operate the actuating mechanism, a single locking device, and means operated by the power mechanism for positively releasing said locking device, substantially as described.

20. The combination with a constantly-running power mechanism, of a type mechanism, an operating-shaft therefor, a normally inoperative actuator, a bank of keys, connections including locking devices controlled by the keys between the actuator and the shaft, connections controlled by the keys for causing the power mechanism to operate the actuator, a locking device carried by the shaft, and means operated by the power mechanism for positively releasing said locking device, substantially as described.

21. The combination with a constantly-running power mechanism, of a type mechanism, an operating-shaft therefor, sleeves on the shaft, a plurality of tumblers for operating the sleeves, means for locking each tumbler to and unlocking it from its sleeve, a normally inoperative actuator, a bank of keys, means controlled by the keys for causing the actuator to operate the tumblers, means controlled by each of the keys for causing the power mechanism to operate the actuator, a locking device carried by the shaft, and power-operated releasing means, substantially as described.

22. The combination with a constantly-running power mechanism, of a type mechanism, an operating-shaft therefor, sleeves on the shaft, a plurality of tumblers for operating the sleeves, means for locking each tumbler to and unlocking it from its sleeve, a normally inoperative actuator, a bank of keys, means including a clutch controlled by the keys for causing the actuator to operate the tumblers, means controlled by each of the keys for causing the power mechanism to operate the actuator, a locking device carried by the shaft, and power-operated releasing means, substantially as described.

23. The combination with a type mechanism including a series of separate characters, of a constantly-running power mechanism, a driver, devices whereby said driver may be secured to the power mechanism, a controller for said devices, operating means whereby the driver actuates the type mechanism to produce an impression from each character, said means being disconnected from the driver, a bank of keys, means whereby each key operates the controller, and means for returning the operating means, substantially as described.

24. The combination with a type mechanism including a series of separate characters, of a constantly-running power mechanism, a cam-driver, devices whereby said driver may be secured to the power mechanism, a controller for said devices, means whereby the driver actuates the type mechanism to produce an impression from each character, a bank of keys, and means whereby each key operates the controller, substantially as described.

25. The combination with a type mechanism including a series of separate characters, of a constantly-running power mechanism, a driver, a stopping mechanism for the driver, devices whereby the driver may be secured to the power mechanism, a controller for said devices, means whereby the driver actuates the type mechanism to produce an impression from each character, said means being disconnected from the driver, a bank of keys, and means whereby each key operates the controller, substantially as described.

26. The combination with a type mechanism including a series of separate characters, of a constantly-running power mechanism, a cam-wheel driver, a stopping mechanism for said wheel, devices whereby the wheel may be secured to the power mechanism, a controller for said devices, means whereby the driver actuates the type mechanism to produce an impression from each character, a bank of keys, and means whereby each key operates the controller, substantially as described.

27. The combination with a type mechanism, of a constantly-running power mechanism, a cam-driver, devices whereby said driver may be secured to the power mechanism, a controller for said devices, a stopping mechanism carried by the controller, means whereby the driver operates the type mechanism to produce an impression from each character, a bank of keys, and means whereby each key operates the controller, substantially as described.

28. The combination with a type mechanism, of a constantly-running power mechanism, a cam-driver, devices whereby said driver may be connected to the power mechanism, a stopping mechanism for the driver, means whereby the driver operates the type mechanism, said means including a part which coöperates with the driver to lock it in opposition to the stopping mechanism, a controller, a bank of keys, and means whereby each key operates the controller, substantially as described.

29. The combination with a constantly-running power mechanism, of a type mechanism, a cam-driver, means whereby the driver may be connected to the power mechanism, a controller, a stopping mechanism carried by the controller, means whereby the driver operates the type mechanism, said means including a part which coöperates with the driver to lock it in opposition to the stopping mechanism, a bank of keys, and means whereby each key operates the controller, substantially as described.

30. The combination with a constantly-running power mechanism, of a type mechanism, a driver, means whereby the driver operates the type mechanism to produce an impression from each character, means including a face-clutch for connecting the driver to the power mechanism, a controller, a bank of keys, and means whereby each key operates the controller, substantially as described.

31. The combination with a constantly-running power mechanism, of a type mechanism, a cam-driver, means whereby the driver operates the type mechanism, means including a face-clutch for connecting the driver to the power mechanism, a controller, a stopping device carried by the controller, a bank of keys, means whereby each key operates the controller, and means whereby the driver operates the type mechanism to produce an impression from each character, substantially as described.

32. The combination with a constantly-running power mechanism, of a type mechanism, a cam-driver, means whereby the driver operates the type mechanism, means including a face-clutch for connecting the driver to the power mechanism, a controller, a stopping device carried by the controller, a bank of keys, means whereby each key operates the controller, and means whereby the driver operates the type mechanism, said means including a part which coöperates with the driver to lock it in opposition to the stopping device, substantially as described.

33. The combination with a constantly-running power mechanism, of a type mechanism, a cam-driver, said driver having an engaging side, means for connecting the driver to the power mechanism, a controller, a stopping device, a bank of keys, means whereby each key operates the controller, and means whereby the driver operates the type mechanism, said means including a sliding bar having an engaging side which coöperates with the driver to lock it, substantially as described.

34. The combination with a constantly-running power mechanism, of a type mechanism, a cam-driver, said driver having an engaging side, means including a face-clutch for connecting the driver to the power mechanism, a controller, a stopping device, a bank of keys, means whereby each key operates the controller, and means whereby the driver operates the type mechanism, said means including a sliding bar having an engaging side which coöperates with the driver to lock it, substantially as described.

35. The combination with a constantly-running power mechanism, of a type mechanism, a cam-driver, said driver having an engaging side, means for connecting the driver to the power mechanism, a controller, a stopping device carried by the controller, a bank of keys, means whereby each key operates the controller, and means whereby the driver operates the type mechanism, said means including a sliding bar having an engaging side which coöperates with the driver to lock it, substantially as described.

36. The combination with a constantly-running power mechanism, of a type mechanism, a cam-driver, said driver having an engaging side, means including a face-clutch for connecting the driver to the power mechanism, a controller, a stopping device carried by the controller, a bank of keys, means whereby each key operates the controller, and means whereby the driver operates the type mechanism, said means including a sliding bar having an engaging side which coöperates with the driver to lock it, substantially as described.

37. The combination with a constantly-running power mechanism, of a type mechanism, a driver, a face-clutch between the driver and the constantly-running power mechanism, a controller, means carried by the controller for disconnecting the clutch, a bank of keys, connections whereby each key operates the controller, and actuating connections between the driver and the type mechanism to produce an impression from each character, substantially as described.

38. The combination with a constantly-running power mechanism, of a type mechanism, a driver, a face-clutch between the driver and the constantly-running power mechanism, a controller, means carried by the controller for disconnecting the clutch, a bank of keys, means whereby each key operates the controller, a normally stationary actuator, operating connections between the actuator and the driver, and operating connections controlled by the keys whereby the actuator operates the type mechanism, substantially as described.

39. The combination with a constantly-running power mechanism, of a type mechanism, a driver, a face-clutch between the driver and the power mechanism, a controller, means carried by the controller for disconnecting the clutch, a stopping device for the driver also carried by the controller, a normally inoperative actuator, operating connections between the driver and the actuator, and key-controlled connections between the type mechanism and the actuator, substantially as described.

40. The combination with a constantly-running power mechanism, of a type mechanism, a driver, a reciprocating bar operated in one direction by the driver, means for disconnecting the driver from the power mechanism after each operation, means for stopping the forward movement of the driver, means whereby the return movement of the bar prevents backward movement of the driver, and means whereby the bar operates the type mechanism, substantially as described.

41. The combination with a constantly-running power mechanism, of a driver, a clutch between the driver and the power mechanism, a type mechanism, operating connections between the driver and the type mechanism, said connections including a reciprocating bar which is moved in one direction by the driver, a device for stopping the forward movement of the driver, a spring for returning the bar, and means whereby the bar prevents a backward movement of the driver, substantially as described.

42. The combination with a constantly-running power mechanism, of a driver, a clutch, a controller for the clutch, a stopping device carried by the controller, a bank of keys, means whereby each key operates the controller, a normally stationary actuator, connections including a reciprocating bar operated in one direction by the driver, operating connections controlled by the keys between the actuator and the type mechanism, a spring for returning the bar, and means whereby the bar prevents backward movement of the driver, substantially as described.

43. The combination with a type mechanism, of a normally stationary actuating-bar, a bank of keys, means controlled by each key for connecting the type mechanism to the actuating-bar, a shaft for operating the actuating-bar, an arm on the shaft, a spring connected to the arm, a slotted bar, a plate adjustably secured to the arm, a loose connection between the plate and the slotted bar, said bar bearing against the spring and moving with the plate when the same is adjusted, a power mechanism for operating the bar, and key-controlled connections between the power mechanism and the bar, substantially as described.

44. The combination with a power mechanism, of a type mechanism, a driver, a bank of keys, means controlled by the keys for connecting the driver to the power mechanism, operating connections including a reciprocating bar operated in one direction by the driver between the power mechanism and the type mechanism, means for returning the bar, and a stop for limiting the return movement of the bar, substantially as described.

45. The combination with a power mechanism, of a type mechanism, a driver, a bank of keys, means controlled by the keys for connecting the driver and the power mechanism, operating connections including a reciprocating bar disconnected from the driver between the power mechanism and the type mechanism, means for returning the bar, a stop for limiting the return movement of the bar, an actuating-bar, connections between the actuating-bar and the operating-bar, and connections between the type mechanism and the actuating-bar, said connections including shouldered locking-levers, the shoulders of which engage the actuating-bar, substantially as described.

46. The combination with a constantly-running power mechanism, of a driver, a clutch between the driver and the power mechanism, a bank of keys, a controller for the clutch operated by each of the keys, a normally stationary actuator, a type mechanism, key-controlled connections including shouldered locking-levers the shoulders of which engage the actuator between the type mechanism and the actuator, operating connections between the driver and the actuator said connections including a reciprocating bar which is moved in one direction by the driver, and a stop for limiting the return movement of the bar, substantially as described.

47. The combination with a constantly-running power mechanism, of a driver, a clutch between the driver and the power mechanism, a bank of keys, a controller for the clutch operated by each of the keys, a normally stationary actuator, a type mechanism, key-controlled connections including shouldered locking-levers the shoulders of which engage the actuator between the type mechanism and the actuator, operating connections between the driver and the actuator said connections including a reciprocating bar which is moved in one direction by the driver, a two-armed lever, to one of the arms of which the bar is connected, and an adjustable stop coöperating with the other arm of the lever, substantially as described.

48. The combination with a constantly-running power-shaft, of a short shaft driven therefrom, brackets in which said shaft is supported, a driver mounted on the shaft, a face-clutch for connecting the driver to the shaft, a controller for said clutch, a type mechanism, operating connections between the type mechanism and the driver, and connections whereby each key operates the controller, substantially as described.

49. The combination with a constantly-running power mechanism, of a type mechanism, a driver, a face-clutch between the driver and the power mechanism, a controller, a bank of keys, operating connections between the keys and the controller, means carried by the controller for disconnecting the clutch, means operated by the driver for rendering the controller-operating means inoperative and for throwing the controller into position to disconnect the clutch, and operating connections between the driver and the type mechanism, substantially as described.

50. The combination with a constantly-running power mechanism, of a driver, a face-clutch between the driver and the power mechanism, a controller, a bank of keys, operating connections whereby each key operates the controller, a stopping device carried by the controller, means carried by the controller for disconnecting the clutch, means operated by the driver for rendering inoperative the controller-operating means and for positioning the controller so as to disconnect the clutch for each operation of the driver, a type mechanism, and operating connections between the type mechanism and the driver, substantially as described.

51. The combination with a constantly-running power mechanism, of a cam-driver, a face-clutch between the driver and the power mechanism, a controller for the clutch, a bank of keys, means including a sliding bar whereby the keys operate the controller, a clutch-disconnecting cam carried by the controller, a driver-stop carried by the controller, an arm, a cam moving with the driver operating to disconnect the controller-operating bar and to throw the controller into position so that its disconnecting-cam is operative, a type mechanism, operating mechanism including a reciprocating bar between the driver and the type mechanism, and means whereby the driver and said reciprocating bar prevent a rebound of the driver as the driver-stop comes into operation, substantially as described.

52. The combination with a constantly-running power mechanism, of a cam-driver, a face-clutch between the driver and the power mechanism, a controller for the clutch, a bank of keys, means including a sliding bar whereby the keys operate the controller, a clutch-disconnecting cam carried by the controller, a driver-stop carried by the controller, an arm, a cam moving with the driver operating to disconnect the controller-operating bar and to throw the controller into position so that its disconnecting-cam is operative, a type mechanism, an actuating-bar, key-controlled connections including shouldered locking-levers the shoulders of which engage the actuating-bar between the type mechanism and the bar, operating mechanism including a reciprocating bar between the driver and the actuator, and means whereby the driver and said reciprocating bar prevent a rebound of the driver as the driver-stop comes into operation, substantially as described.

53. The combination with a constantly-running power mechanism, of a driver, a type mechanism, a clutch for connecting the driver to the power mechanism, a series of key-levers, a clutch, operating member common to all the levers and engaged by each of them, means whereby said member operates the clutch, and operating connections between the driver and the type mechanism whereby an impression is produced from each character, substantially as described.

54. The combination with a constantly-running power mechanism, of a driver, a clutch for connecting the driver to the power mechanism, a controller for the clutch, a type mechanism, operating connections between the driver and the type mechanism whereby an impression is produced from each character, a series of key-levers, a clutch-operating member common to all the levers and engaged by each of them, and connections between said member and the controller, substantially as described.

55. The combination with a constantly-running power mechanism, of a driver, a clutch for connecting the driver to the power mechanism, a controller for the clutch, a type mechanism, operating connections between the driver and the type mechanism whereby an impression is produced from each character, a series of key-levers, a rock-shaft common to all the levers and engaged by each of them, and connections between said rock-shaft and the controller, substantially as described.

56. The combination with a constantly-running power mechanism, of a driver, a clutch for connecting the driver to the power mechanism, a type mechanism, operating connections between the driver and the type mechanism whereby an impression is produced from each character, a series of shouldered key-levers, a clutch-operating member common to all the key-levers and engaged by the shoulder of each of them and operating connections between said member and the clutch, substantially as described.

57. The combination with a constantly-running power mechanism, of a driver, a clutch for connecting the driver to the power mechanism, a controller for the clutch, a series of shouldered key-levers, a ribbed rock-shaft arranged to be engaged by the shoulder on each key-lever, operating connections between the rock-shaft and the controller, a normally stationary actuating mechanism, operating connections between the driver and the actuating mechanism, and key-controlled connections between the actuating mechanism and the type mechanism, substantially as described.

58. In a type-writing machine, the combination with the type mechanism and the paper-support, of devices for producing a relative step-by-step spacing movement between the support and the type mechanism, a power mechanism and connections whereby the power mechanism places the spacing devices in condition to produce said movement, substantially as described.

59. In a type-writing machine, the combination with the type mechanism, of a carriage, feeding devices for giving said carriage a step-by-step spacing movement, a power mechanism and means controlled by the power mechanism for positioning the feeding devices to produce the spacing movement of the carriage, substantially as described.

60. In a type-writing machine, the combination with the type mechanism, of a carriage, a feeding device, means for giving the device forward movement to produce a step-by-step spacing movement of the carriage, a power mechanism and means whereby the power mechanism retracts said device after each feeding movement, substantially as described.

61. In a type-writing machine, the combination with the type mechanism, of a carriage, a feeding-pawl, means for giving the pawl a forward movement to produce a step-by-step spacing movement of the carriage, a power mechanism, and means whereby the power mechanism retracts the pawl after each feeding movement, substantially as described.

62. In a type-writing machine, the combination with the type mechanism, of a power mechanism for operating said type mechanism, a spacing mechanism including an advancing means constructed to produce varying amounts of movement, and means controlled by the power mechanism for determining the amount of said advancing movement substantially as described.

63. In a type-writing machine, the combination with the type mechanism, of a power mechanism for operating said type mechanism, a feeding device, means for giving the feeding device forward movements to produce step-by-step spacing movements of the carriage and means whereby the power mechanism gives said device backward movements of varying amounts, substantially as described.

64. In a type-writing machine, the combination with the type mechanism, of a power mechanism for operating said type mechanism, a carriage, a feeding-pawl, a spring for giving said pawl forward movements, to give the carriage step-by-step spacing movements and means whereby the power mechanism gives the pawl backward movements of varying amounts, substantially as described.

65. The combination with a constantly-running power mechanism, of a driver, a clutch for connecting the driver to the power mechanism, a type mechanism including an alphabet of type, connections between the driver and the type mechanism operating to produce an impression from each character, a spacing mechanism, connections between the spacing mechanism and the power mechanism, a series of key-levers, a clutch-operating member common to all the levers and engaged by each of them, a spacer and operating connections between the spacer and the clutch-operating member, substantially as described.

66. The combination with a constantly-running power mechanism, of a driver normally disconnected therefrom, a clutch for connecting the driver to the power mechanism, a controller for the clutch, a type mechanism including an alphabet of type, connections between the driver and the type mechanism operating to produce an impression from each character, a spacing mechanism, connections between the spacing mechanism and the power mechanism, a series of key-levers, a clutch-operating member common to all the levers and engaged by each of them, connections between said member and the controller, a spacer, and operating connections between the spacer and the clutch-operating member, substantially as described.

67. The combination with a constantly-running power mechanism, of a driver normally disconnected therefrom, a clutch for connecting the driver to the power mechanism, a controller for the clutch, a type mechanism including an alphabet of type, connections between the driver and the type mechanism operating to produce an impression from each character, a spacing mechanism, connections between the spacing mechanism and the power mechanism, a series of key-levers, a rock-shaft common to all the levers and engaged by each of them, connections between said rock-shaft and the controller, a spacer, and operating connections between the spacer and the rock-shaft, substantially as described.

68. The combination with a constantly-running power mechanism, of a driver, a clutch for connecting the driver to the power mechanism, a spacing mechanism, connections between the spacing mechanism and the driver, a spacer, a rock-shaft, a lever operated by the spacer and serving to rock the shaft, and means whereby the movement of the rock-shaft operates the clutch, substantially as described.

69. The combination with a constantly-running power mechanism, of a normally inoperative actuating mechanism, a spacing mechanism normally disconnected from the actuating mechanism, a spacer, and means operated by the spacer for connecting the power mechanism to the actuating mechanism and for connecting the actuating mechanism to the spacing mechanism, substantially as described.

70. The combination with a power mechanism, of a normally inoperative actuating-bar, connections including a clutch between the bar and the power mechanism, a spacing mechanism normally disconnected from the actuating-bar, a spacer, and means whereby the spacer connects the spacing mechanism to the bar and operates the clutch to connect the power mechanism to the bar, substantially as described.

71. The combination with a constantly-running power mechanism, of a driver normally disconnected therefrom, a clutch for connecting the driver to the power mechanism, an actuator, operating connections between the actuator and the driver, a spacing mechanism normally disconnected from the actuator, a spacer, a locking device for connecting the spacing mechanism to the actuator, means whereby the spacer operates said locking mechanism, and means whereby the spacer operates the clutch, substantially as described.

72. The combination with a type mechanism, of a power mechanism, means operated from the power mechanism for producing letter-spaces simultaneously with the action of the type mechanism, means operated from the power mechanism for producing letter-spaces independently of the action of the type mechanism, both sets of means being simultaneously operative to produce spaces of increased length, substantially as described.

73. The combination with a type mechanism, of a power mechanism, a spacing mechanism, means for actuating the spacing mechanism simultaneously with the type mechanism, means whereby the power mechanism operates the spacing mechanism independently of the type mechanism, said sets of means being simultaneously operative to produce spaces of increased length, substantially as described.

74. The combination with a power mechanism of a type mechanism, spacing devices, a spacer, a series of key-levers, means whereby the key-levers cause the power mechanism to operate the type mechanism and the spacing devices simultaneously, means whereby the spacer causes the power mechanism to operate the spacing devices independently of the type mechanism, both sets of means being simultaneously operative whereby the joint operation of the key-levers and spacer cause a space of increased length to be produced, substantially as described.

75. The combination with a power mechanism, of a spacing mechanism, said mechanism including an actuating member, a spacer, a series of type-levers, connections between the power mechanism and the actuating mechanism controlled by the spacer, whereby the power mechanism actuates the member to produce a space, connections between the power mechanism and the actuating member controlled by the levers whereby the power mechanism is caused to actuate the member to produce a space, said connections being simultaneously in operative condition and the actuating member being so arranged with respect thereto that the simultaneous operation of the spacer and a key-lever produces a space of increased length, substantially as described.

76. The combination with a power mechanism, of a type mechanism, a spacing mechanism, said mechanism including an actuating member, a spacer, a series of type-levers, connections controlled by the type-levers whereby the power mechanism is caused to produce a simultaneous operation of the type mechanism and the actuating member, connections controlled by the spacer whereby the power mechanism is caused to operate the actuating member, said actuating member and connections being so arranged that a simultaneous operation of the spacer and a type-lever causes the power mechanism to operate the type mechanism and the actuating member to produce a space of increased length, substantially as described.

77. The combination with a power mechanism, of a spacing mechanism, said mechanism including an actuating-lever, connections between the power mechanism and the actuating-lever controlled by the spacer, connections between the actuating-lever and the power mechanism controlled by the type-levers, the construction being such that the operation of either the spacer or a type-lever effects a movement of the actuating-lever to produce a space, and a simultaneous movement of the spacer and a type-lever effects a movement of the actuating-lever to produce a space of an increased length, substantially as described.

78. The combination with a power mechanism, of a type mechanism, an actuating mechanism therefor, a series of key-levers, a spacing mechanism operated by the actuating mechanism but normally disconnected therefrom, a spacer, means controlled by the spacer for connecting the spacing mechanism to the actuating mechanism, means controlled by the key-levers for causing the actuating mechanism to operate the type mechanism, and means whereby the type mechanism actuates the spacing mechanism, substantially as described.

79. The combination with a power mechanism, of a normally stationary actuating mechanism, a type mechanism, a series of key-levers, key-controlled connections between the power mechanism and the actuating mechanism and between the actuating mechanism and the type mechanism, a spacing mechanism including a pivoted actuating-lever, a spacer, means controlled by the spacer for causing the actuating mechanism to give the actuating-lever a pivotal movement, means whereby the type mechanism gives the actuating mechanism a pivotal movement, and means whereby a joint operation of the type mechanism and the spacer gives the lever a bodily movement whereby a space of increased length is produced, substantially as described.

80. The combination with a power mechanism, of a normally stationary actuating-bar, a type mechanism, a series of key-levers, key-controlled connections between the power mechanism and the actuating-bar and between the type mechanism and the actuating-bar, a spacing mechanism, said mechanism including a pivoted actuating-lever, an operating-lever for said actuating-lever, a locking device for securing said operating-lever to the actuating-bar, a spacer, means whereby said spacer operates the locking device and causes the power mechanism to move the actuating-bar, said actuating-bar through its connection operating upon one end of the actuating-lever to produce a spacing movement, means whereby the type mechanism operates upon the other end of the pivoted lever to give it a spacing movement, the construction being such that when both the spacer and a type-lever are operated both ends of the actuating-lever are operated upon and said lever gives the spacing mechanism an increased movement, substantially as described.

81. The combination with a spacing mechanism including a sliding space-plate, of an actuating-lever carried thereby, a spacing-lever, connections between the spacing-lever and one end of the actuating-lever, a type mechanism, operating connections between the type mechanism and the other end of the spacing-lever, an actuator, a bank of keys, and a normally inoperative key-controlled connection between the actuator and the spacing-lever, substantially as described.

82. The combination with a spacing mechanism including a sliding space-plate, of an actuating-lever carried thereby, a spacing-lever, connections between the spacing-lever and one end of the actuating-lever, a type mechanism, operating connections between the type mechanism and the other end of the spacing-lever, an actuator, a bank of keys, a normally inoperative key-controlled connection between the actuator and the spacing-lever, a power mechanism, and a normally inoperative key-controlled connection between the power mechanism and the actuator, substantially as described.

83. The combination with a power mechanism, of an actuating-bar, a spacing mechanism including a locking member, a spacer, and means whereby the spacer causes the power mechanism to operate the actuating-bar and locks the locking member to said bar, substantially as described.

84. The combination with a normally inoperative actuator, of a spacing mechanism including an actuating member, normally inoperative connections between the actuating member and the actuator, a spacer, means whereby said spacer renders the connections between the actuating mechanism and the actuator operative, and means for operating the actuator, substantially as described.

85. The combination with a constantly-running power mechanism, of an actuating-bar normally disconnected therefrom, connections including a clutch whereby the power mechanism operates the actuating-bar, a spacer, clutch-releasing devices operated by the spacer, a spacing mechanism normally disconnected from the actuating-bar, and locking devices operated from the clutch-releasing devices for securing the spacing mechanism to the actuating-bar, substantially as described.

86. The combination with a constantly-running power mechanism, of an actuating-bar normally disconnected therefrom, connections including a clutch for causing the power mechanism to operate the actuating-bar, a spacer, a clutch-releasing lever operated by the spacer, a spacing mechanism, and locking devices operated by the clutch-releasing lever for securing the spacing mechanism to the actuating-bar, substantially as described.

87. The combination with a constantly-running power mechanism, of a type mechanism, an actuating mechanism, a series of key-levers, key-controlled connections including a clutch and a releasing device therefor between the power mechanism and the actuating mechanism, key-controlled connections between the actuating mechanism and the type mechanism, a spacer, means whereby the clutch-releasing device is controlled by the spacer, a spacing mechanism including an actuating member, an operating member for said actuating member, a locking device operated by the clutch-releasing device for securing the operating member to the actuating mechanism, and means whereby the type mechanism operates the actuating member, substantially as described.

88. The combination with a power mechanism, of a normally stationary actuating-bar, a type mechanism, a bank of keys, key-controlled connections between the power mechanism and the actuating-bar, key-controlled connections between the actuating-bar and the type mechanism, said connections including a series of locking-levers, and a guide overlying the levers and operating to insure the engagement of the levers with the actuating-bar, substantially as described.

89. The combination with a power mechanism, of a normally stationary actuating-bar, a type mechanism, a bank of keys, key-controlled connections between the power mechanism and the actuating-bar, key-controlled connections between the actuating-bar and the type mechanism, said connections including a series of locking-levers, and a rotary guide overlying the levers and operating to insure the engagement of the levers with the actuating-bar, substantially as described.

90. The combination with a power mechanism, of a normally stationary actuating-bar, a type mechanism, a bank of keys, key-controlled connections between the power mechanism and the actuating-bar, key-controlled connections between the type mechanism and the actuating-bar, said connections including a series of shouldered bell-cranks arranged to engage the bar, and a rotary guide overlying one of the arms of each of the bell-cranks and operating to insure their engagement with the bar, substantially as described.

91. The combination with a power mechanism, of a type mechanism, a normally stationary actuating-bar, key-controlled connections between the power mechanism and the actuating-bar, key-controlled connections between the type mechanism and the bar, said connections including a series of locking members which are constructed to have a slidable connection with the actuating-bar, substantially as described.

92. The combination with a power mechanism, of a type mechanism, a normally stationary actuating-bar, key-controlled connections between the power mechanism and the actuating-bar, key-controlled connections between the type mechanism and the bar, said connections including a series of locking-levers having shoulders which engage the bar, the levers being formed to leave a free space behind the bar when their shoulders are engaged therewith so as to permit the levers to have a forward movement independent of the bar, substantially as described.

93. The combination with a power mechanism, of an actuating-bar, a type-wheel, key-controlled connections between the actuator-bar and the power mechanism, a series of segment-levers, a series or shouldered key-controlled locking-levers one for each segment-lever arranged to engage the actuating-bar, the levers being formed so as to leave a free space in the rear of the bar when they are engaged therewith, a series of tumblers operated by the segment-levers, and connections between the tumblers and the type-wheel, substantially as described.

94. The combination with a type-carrier, of an operating mechanism therefor said mechanism including a series of tumblers having graduated operating-faces, an actuator, means for giving the actuator a constant movement, and means whereby the actuator imparts a varying movement to the tumblers, substantially as described.

95. The combination with a type-carrier, of an operating mechanism therefor said mechanism including a series of tumblers having graduated operating-faces, an actuator, a power mechanism, connections whereby the power mechanism imparts a constant movement to the actuator, and means whereby the actuator imparts a varying movement to the tumblers, substantially as described.

96. The combination with a type-carrier, of an operating mechanism therefor said mechanism including a series of tumblers having graduated faces, of a normally stationary actuator, a constantly-running power mechanism, key-controlled connections between the power mechanism and the actuator, said connections enabling the power mechanism to impart a constant movement to the actuator, and means whereby the actuator imparts a varying movement to the tumblers, substantially as described.

97. The combination with a type-carrier, of an operating mechanism therefor said mechanism including a series of tumblers having graduated faces, an actuator, a power mechanism normally disconnected from the actuator, key-controlled connections between the power mechanism and the actuator whereby said power mechanism imparts a constant movement to the actuator, a series of operating members for the tumblers, means whereby said members impart a varying movement to the tumblers, and key-controlled locking devices between the members and the actuator, substantially as described.

98. The combination with a type-carrier, of an operating mechanism therefor said mechanism including a series of toothed tumblers having graduated faces, the teeth of said tumblers being on different pitch-lines, an actuator, and means whereby said actuator operates the tumblers, substantially as described.

99. The combination with a type-carrier, of an operating mechanism therefor said mechanism including a series of toothed tumblers having graduated faces, the teeth of said tumblers being on different pitch-lines, an actuator, means whereby said actuator operates the tumblers, and power mechanism for operating the actuator, substantially as described.

100. The combination with a type-carrier, of an operating mechanism therefor said mechanism including a series of toothed tumblers having graduated faces, a series of segment-levers for operating the tumblers, a normally stationary actuating-bar, means for operating the bar, a bank of keys, and key-controlled locking devices between the segment-levers and the actuating-bar, substantially as described.

101. The combination with a type-carrier, of an operating mechanism therefor said mechanism including a series of toothed tumblers having graduated faces, a series of segment-levers for operating the tumblers, a normally stationary actuating-bar, a bank of keys, key-controlled locking devices between the segment-levers and the actuating-bar, a power mechanism, and key-controlled connections between the power mechanism and the actuating-bar, substantially as described.

102. The combination with a type-carrier, of an operating mechanism therefor, said mechanism including a series of tumblers having graduated faces, an actuating-bar, a series of operating members for the tumblers, said members being arranged to give the tumblers varying degrees of movement, a bank of keys, a series of shouldered locking-levers carried by the members, said levers being arranged to engage the actuating-bar and to leave a free space behind the bar when they are engaged, a power mechanism, and operating connections including a spring between the power mechanism and the actuating-bar, substantially as described.

103. The combination with a type-carrier, of an operating mechanism therefor said mechanism including a series of toothed tumblers having graduated faces, the teeth of the tumblers being arranged on different pitch-lines, a series of segment-levers for operating the tumblers, an actuating-bar, a bank of keys, key-controlled shouldered locking-levers for securing the tumblers to the actuating-bar said levers being arranged to leave a free space behind the bar when they are engaged therewith, a power mechanism, a driver normally disconnected therefrom, key-controlled connections between the driver and the power mechanism, and operating connections including a spring between the driver and the actuating-bar, substantially as described.

104. The combination with a constantly-running power mechanism, of an actuating mechanism, a series of key-levers, key-controlled connections between the power mechanism and the actuating mechanism, a type mechanism, connections including locking devices operated by the key-levers between the actuating mechanism and the type mechanism, supporting members for said locking devices, and a yielding stop for preventing the movement of the supporting members when the locking devices are operated, substantially as described.

105. The combination with a constantly-running power mechanism, of a normally inoperative actuating mechanism, key-levers, key-controlled connections between the power mechanism and the actuating mechanism, operating connections including a series of levers between the actuating mechanism and the type mechanism, a series of locking devices, one for each lever, operated by the key-levers, and a yielding stop for preventing the movement of any one of the series of levers when its locking device is operated, substantially as described.

106. The combination with a constantly-running power mechanism, of a normally inoperative actuating mechanism, a series of key-levers, key-controlled connections between the power mechanism and the actuating mechanism, a type mechanism, operating connections including a series of segment-levers between the actuating mechanism and the type mechanism, a series of locking-levers carried on the segment-levers and operated by the segment-levers, and a yielding stop for preventing movement of the segment-levers, substantially as described.

107. The combination with a constantly-running power mechanism, of a normally inoperative actuating mechanism, a series of key-levers, key-controlled connections between the power mechanism and the actuating mechanism, a type mechanism, operating connections including a series of segment-levers between the actuating mechanism and the type mechanism, a series of locking-levers carried on the segment-levers and operated by the segment-levers, and a yieldingly-mounted bar extending across the segment-levers for preventing the movement of said levers when the locking-levers are operated, substantially as described.

108. The combination with a power mechanism, of a type mechanism, connections whereby the power mechanism operates the type mechanism, a bank of keys, key-controlled connections for rendering the power mechanism operative, and means for locking said key-controlled connections at the end of the line, substantially as described.

109. The combination with a power mechanism, of a type mechanism, connections whereby the power mechanism operates the type mechanism, a bank of keys, key-controlled connections for rendering the power mechanism operative, and automatic means for locking said key-controlled connections at the end of the line, substantially as described.

110. The combination with a power mechanism, of a type mechanism, connections whereby the power mechanism operates the type mechanism, a bank of keys, key-controlled connections whereby the power mechanism is rendered operative, a carriage, and means controlled by the carriage for locking said key-controlled connections at the end of the line, substantially as described.

111. The combination with a power mechanism, of a type mechanism normally disconnected from the power mechanism, a bank of keys, key-controlled connections between the power mechanism and type mechanism, key-controlled means for rendering the power mechanism operative, and devices for locking said means for rendering them inoperative, substantially as described.

112. The combination with a type mechanism of a constantly-running power mechanism, a bank of keys, connections controlled by the keys whereby the power mechanism operates the type mechanism, means controlled by the keys for rendering the power mechanism operative, a carriage, and means controlled by the carriage for locking said means at the end of the line, substantially as described.

113. The combination with a type mechanism, of a constantly-running power mechanism, a normally inoperative actuating mechanism, connections controlled by the keys whereby the power mechanism operates the actuating mechanism, means controlled by the keys for rendering said connections operative, a carriage, and means whereby said carriage locks said key-controlled means at the end of the line, substantially as described.

114. The combination with a power mechanism, of a type mechanism normally disconnected therefrom, a bank of keys, means including a clutch for causing the power mechanism to operate the type mechanism, key-controlled means for operating the clutch, and devices for locking said means in order to prevent the operation of the clutch, substantially as described.

115. The combination with a power mechanism, of a type mechanism normally disconnected therefrom, a bank of keys, means including a clutch for causing the power mechanism to operate the type mechanism, key-controlled means for operating the clutch, a paper-carriage, and means controlled by the carriage for locking said connections for preventing the operation of the clutch, substantially as described.

116. The combination with a type mechanism, of a power mechanism, a driver disconnected therefrom, operating connections between the driver and the type mechanism, a clutch for connecting the driver to the power mechanism, a bank of keys, a clutch-releasing member operated by the keys, a paper-carriage, and means controlled by the carriage for locking the releasing member, whereby the operation of the clutch is prevented, substantially as described.

117. The combination with a power mechanism, of a driver normally disconnected therefrom, a type mechanism, a clutch for connecting the driver to the power mechanism, operating connections between the driver and the type mechanism, a bank of keys, a clutch-releasing member operated by the keys, a paper-carriage, and a locking-bar for the clutch-releasing member operated by the carriage, substantially as described.

118. The combination with a constantly-running power mechanism, of a driver normally disconnected therefrom, a clutch for connecting the driver to the power mechanism, a type mechanism, operating connections between the driver and the type mechanism, a series of key-levers, a clutch-releasing member operated by the key-levers, a locking-bar, a paper-carriage, and means including an adjustable stop whereby the movement of the carriage operates the locking-bar and causes it to lock the clutch-releasing member, substantially as described.

119. The combination with a constantly-running power mechanism, of a type mechanism, means whereby the type mechanism is operated from the power mechanism, a paper-carriage, a spacing mechanism therefor, means whereby the power mechanism operates the spacing mechanism, and a locking device operated by the paper-carriage for preventing the power mechanism from operating the spacing mechanism, substantially as described.

120. The combination with a constantly-running power mechanism, of a driver normally disconnected therefrom, a clutch for connecting the power mechanism to the driver, a type mechanism, operating connections between the driver and the type mechanism, a paper-carriage, a spacing mechanism, a spacer, a series of key-levers, a clutch-releasing member operated by the spacer and the key-levers, and means controlled by the carriage for locking the clutch-releasing member, substantially as described.

121. The combination with a constantly-running power mechanism, of a driver normally disconnected therefrom, a clutch for connecting the driver to the power mechanism, a normally stationary actuating mechanism, operating connections between the driver and said actuating mechanism, a type mechanism, a series of key-levers, key-controlled connections between the actuating mechanism and the type mechanism, a clutch-releasing mechanism including a rock-shaft which is operated by the key-levers, a locking projection on said shaft, a paper-carriage, a locking member, and means including an adjustable stop whereby the carriage causes the member to engage the projection to lock the shaft so as to prevent the operation of the clutch, substantially as described.

122. The combination with a constantly-running power mechanism, of a driver normally disconnected therefrom, a clutch for connecting the driver to the power mechanism, a normally stationary actuating mechanism, operating connections between the driver and said actuating mechanism, a type mechanism, a series of key-levers, key-controlled connections between the actuating mechanism and the type mechanism, a paper-carriage, a spacing mechanism, a spacer, a clutch-releasing mechanism including a rock-shaft which is operated by the key-levers and the spacer said shaft having a locking projection, and a locking member including an adjustable stop whereby the carriage causes the member to engage the projection on the rock-shaft whereby the operation of the clutch is prevented, substantially as described.

123. In a power type-writer, the combination with the power mechanism, the carriage and the spacing mechanism, of means independent of the spacing mechanism whereby the power mechanism may drive the carriage in either direction, substantially as described.

124. In a power type-writer, the combination with the power mechanism, the carriage and the spacing mechanism, of key-controlled means independent of the spacing mechanism whereby the power mechanism may drive the carriage in either direction, substantially as described.

125. In a power type-writer, the combination with the power mechanism, the carriage and the spacing mechanism, of means independent of the spacing mechanism for driving the carriage in the direction in which it is moved by the spacing mechanism, substantially as described.

126. In a power type-writer, the combination with the power mechanism, the carriage and the spacing mechanism, of key-controlled means independent of the spacing mechanism for driving the carriage in the direction in which it is moved by the spacing mechanism, substantially as described.

127. In a power type-writer, the combination with the power mechanism, the carriage and the spacing mechanism, of means for rendering said spacing mechanism inoperative, a shaft, driving connections between the shaft and the carriage, and means whereby the power mechanism drives the shaft in opposite directions, whereby the carriage may be driven in either direction, substantially as described.

128. In a power type-writer, the combination with the power mechanism, the carriage and the spacing mechanism, of means for rendering said spacing mechanism inoperative, a shaft, driving connections between the shaft and the carriage, and key-controlled means whereby the power mechanism drives the shaft in opposite directions, whereby the carriage may be driven in either direction, substantially as described.

129. In a power type-writer, the combination with the power mechanism, the carriage and the spacing mechanism, of means for rendering said spacing mechanism inoperative, a shaft, normally operative driving connections between the shaft and the carriage, and means whereby the power mechanism drives the shaft in either direction, substantially as described.

130. In a power type-writer, the combination with the power mechanism, the carriage and the spacing mechanism, of means for rendering said spacing mechanism inoperative, a shaft, normally operative driving connections between the shaft and the carriage, and key-controlled means whereby the power mechanism drives the shaft in either direction, substantially as described.

131. In a power type-writer, the combination with the power mechanism, the carriage and the spacing mechanism, of means for rendering the spacing mechanism inoperative, a shaft, driving devices intermediate the carriage and the shaft, a support, driving-wheels mounted on the support, devices intermediate the shaft and the driving-wheels whereby the wheels turn the shaft in opposite directions, a driven shaft provided with means for driving the wheels, and means for moving the support to bring either driving-wheel into operative connection with the driving means on the driven shaft, substantially as described.

132. In a power type-writer, the combination with the power mechanism, the carriage and the spacing mechanism, of means for rendering the spacing mechanism inoperative, a shaft, driving devices intermediate the carriage and the shaft, a support, keys for moving the support, driving-wheels mounted on the support, devices intermediate the shaft and the driving-wheels whereby the wheels turn the shaft in opposite directions, a driven shaft provided with means for driving the wheels, and means for moving the support to bring either driving-wheel into operative connection with the driving means on the driven shaft, substantially as described.

133. In a power type-writer, the combination with a power mechanism, the carriage and the spacing mechanism, of means for rendering the spacing mechanism inoperative, a shaft, driving devices intermediate the shaft and the carriage, a movable support, driving devices carried thereby for moving the shaft in opposite directions, cams on the support, operating means for the driving devices, and key-levers coöperating with the cams for moving the support to throw the driving devices into coöperative relation with either operating means, substantially as described.

134. In a power type-writer, the combination with the power mechanism, the carriage and the spacing mechanism, of means for rendering the spacing mechanism inoperative, a shaft, driving devices between the shaft and the carriage, a pivoted support, driving-wheels carried thereby, cams connected with the support, key-levers coöperating with the cams to turn the support on its pivot, a driven shaft, and driving devices carried thereby which drive either of the wheels according to the pivotal movement given the support, substantially as described.

135. In a power type-writer, the combination with the power mechanism, the carriage and the spacing mechanism, of means for rendering the spacing mechanism inoperative and means independent of the spacing mechanism whereby the power mechanism may drive the carriage in either direction, the movement in one direction being at a less speed than the movement in the opposite direction, substantially as described.

136. In a power type-writer, the combination with the power mechanism, the carriage and the spacing mechanism, of means for rendering the spacing mechanism inoperative, a shaft, driving connections between the shaft and the carriage, a driven shaft, and trains of gearing between the two shafts each of which includes a member which may be brought into driving relation with the driven shaft whereby the carriage may be moved in opposite directions at different rates of speed, substantially as described.

137. In a power type-writer, the combination with the power mechanism, the carriage and the spacing mechanism, of a shaft, driving devices between the shaft and the carriage said devices being normally in engagement with the carriage, a movable support, driving-wheels carried by the support, gearing between the driving-wheels and the shaft, a driven shaft, keys and suitable connections for moving the support to bring either of the driving-wheels into driving relation with the driven shaft, a lever, and suitable connections for rendering the spacing mechanism inoperative, said lever when actuated operating to lock the support against movement with both the driving-wheels in inoperative position, substantially as described.

138. In a type-writer, the combination with a type mechanism, of a carriage, a spacing mechanism including an operating-plate, a bank of keys for operating the type mechanism, a lever mounted in juxtaposition to the bank of keys, releasing connections between said lever and the operating-plate, a lever mounted on the machine-frame in juxtaposition to the carriage, and releasing connections between said lever and operating-plate, substantially as described.

139. In a type-writer, the combination with a type mechanism, of a carriage, spacing devices, a bank of keys for operating the type mechanism, and means for rendering the spacing devices inoperative, said means including two levers, one mounted in juxtaposition to the bank of keys and the other to the carriage, and an operating member for the spacing devices common to and operated by both levers, substantially as described.

140. The combination with a type-wheel, of a power mechanism, connections between the type-wheel and the power mechanism whereby the wheel is positioned and given a striking movement, and a cushioned adjustable stop for limiting the return movement of the wheel, substantially as described.

141. In a type-writer, the combination with a type mechanism, of a carriage, spacing devices including hold and feeding pawls, a bank of keys, a sliding plate and suitable connections for moving the pawls, a lever mounted in juxtaposition to the bank of keys, means whereby said lever operates the plate, a lever mounted on the machine-frame in juxtaposition to the carriage and means whereby said lever operates the sliding plate, substantially as described.

142. The combination with a power mechanism, of an action-shaft, a support mounted thereon, a type-wheel carrier mounted in the support, key-controlled means including suitable sectors for positioning the wheel and for operating the action-shaft to produce a striking movement of the type-wheel, and an adjustable stop for limiting the return movement of the sectors, substantially as described.

143. The combination with a power mechanism, of an action-shaft, a support mounted thereon, a type-wheel carrier mounted in the support, key-controlled means including suitable sectors for positioning the wheel and for operating the action-shaft to produce a striking movement of the type-wheel, and a cushioned adjustable stop for limiting the return movement of the sectors, substantially as described.

144. The combination with a type-carrier, of means for giving the carrier a printing movement, a pad for inking the type in the path of the carrier with which the type on the carrier contact as it is given its printing movement, a pivoted supporting-frame, and an ink-pad support pivoted in the frame, substantially as described.

145. The combination with a type-carrier, of means for giving the carrier a printing movement, an ink-pad in the path of the carrier and with which the type on the carrier contact as it is given its printing movement, a pivoted supporting-frame, an ink-pad support pivoted in the frame, a spring for holding the pad in position to be struck by the carrier, and a stop limiting the movement of the ink-pad support produced by the carrier, substantially as described.

146. The combination with a type-carrier, of an ink-pad in the path of the carrier, a movable indicator for locating the point of impression, and means whereby the movement of the indicator moves the ink-pad out of position, substantially as described.

147. The combination with a type-carrier, of an ink-pad in the path of the carrier, a movable indicator for locating the point of impression, and means carried by the indicator whereby the movement of the indicator moves the ink-pad out of position, substantially as described.

148. The combination with a type-carrier, of a movable indicator for locating the point of impression, and means whereby the movement of the type-carrier returns the indicator, substantially as described.

149. The combination with a manually-operated indicator, of a type-carrier, a shaft for operating the type-carrier, and an arm on the shaft operating to return the indicator, substantially as described.

150. The combination with a type-carrier, of an indicator, an ink-pad in the path of the carrier, means carried by the indicator for shifting the position of the pad, a shaft for operating the type-carrier, and means operated by the shaft for retaining the indicator, substantially as described.

151. In a type-writer, the combination with a sliding carriage, of two guide-wheels located on one side of the carriage and a third guide-wheel located on the opposite side of the carriage, and means for varying the distance between the two wheels and the single wheel whereby varying widths of carriage may be compensated for, substantially as described.

152. In a type-writing machine, the combination with a type mechanism, of a cam-driver, said driver having a rapidly-increasing eccentricity, and an actuating mechanism between the driver and the type mechanism, substantially as described.

153. In a type-writing machine, the combination with a type mechanism, of a cam-driver, said driver having a rapidly-increasing eccentricity, and an actuating mechanism between the driver and the type mechanism, said actuating mechanism being disconnected from the driver, substantially as described.

154. In a type-writing machine, the combination with a type mechanism, of a cam-driver, said driver having a rapidly-increasing eccentricity and terminating in an abrupt shoulder, and an actuating mechanism between the cam-driver and the type mechanism, substantially as described.

155. In a type-writing machine, the combination with a type mechanism, of a cam-driver, said driver having a rapidly-increasing eccentricity and terminating in an abrupt shoulder, and an actuating mechanism between the cam-driver and the type mechanism, said actuating mechanism being disconnected from the driver, substantially as described.

156. In a type-writing machine, the combination with a type mechanism, of a bank of keys, a normally stationary actuator, key-controlled locking connections between the actuator and the type mechanism, a normally stationary cam-driver, said driver having a rapidly-increasing eccentricity, a power mechanism, key-controlled connections between the power mechanism and the cam-driver, and operating connections between the cam-driver and the actuator, substantially as described.

157. In a type-writing machine, the combination with a type mechanism, of a bank of keys, a normally stationary actuator, key-controlled locking connections between the actuator and the type mechanism, a normally stationary cam-driver, said driver having a rapidly-increasing eccentricity and terminating in an abrupt shoulder, a power mechanism, key-controlled connections between the power mechanism and the cam-driver, and operating connections between the cam-driver and the actuator, said connections being disconnected from the driver, substantially as described.

158. The combination with a type mechanism, of a bank of keys, a normally stationary actuator, key-controlled connections between the type mechanism and the actuator, a cam-driver having rapidly-increasing eccentricity and terminating in an abrupt shoulder, a power mechanism, key-controlled connections between the power mechanism and the driver, and a slide-bar between the actuator and the cam-driver, substantially as described.

159. The combination with a type mechanism, of a bank of keys, an actuating mechanism, key-controlled connections between the type mechanism and the actuating mechanism, a power mechanism, a driver, means whereby the driver operates the actuating mechanism and causes the type mechanism to deliver an elastic blow upon the paper, and key-controlled connections between the power mechanism and the driver, substantially as described.

160. The combination with a type mechanism, of a bank of keys, a normally stationary actuator, key-controlled connections between the actuator and the type mechanism, a power mechanism, a cam-driver having a rapidly-increasing eccentricity and terminating in an abrupt shoulder, said driver having a flat side, key-controlled connections between the driver and the power mechanism, and a slide-bar having a straight side between the actuator and the cam-driver, said side coöperating with the flat side of the driver, substantially as described.

161. The combination with a type mechanism, of a bank of keys, an actuating mechanism, key-controlled connections between the type mechanism and the actuating mechanism, a power mechanism, a driver, means whereby the driver operates the actuating mechanism and causes the type mechanism to move toward the paper with a rapidly-increasing movement, and key-controlled connections between the power mechanism and the driver, substantially as described.

162. The combination with a type mechanism, of a power mechanism, means whereby the power mechanism causes the type mechanism to move toward the paper with a constantly and rapidly increasing movement said means including parts which are free to move with respect to each other whereby the type mechanism is free to move ahead of its impelling mechanism, substantially as described.

163. The combination with a type mechanism, of a power mechanism, and means whereby the power mechanism causes the type mechanism to move toward the paper with a constant and rapidly-increasing movement said means including disconnected parts whereby the type mechanism is free to move ahead of its impelling mechanism, substantially as described.

164. The combination with a type mechanism, of a power mechanism, a driver, an actuating mechanism between the type mechanism and the driver and disconnected from the driver and means whereby the driver imparts a rapidly-increasing movement to the actuating mechanism, substantially as described.

In testimony whereof I have hereunto set my hand in the presence of two subscribing witnesses.

GEORGE C. BLICKENSDERFER.

Witnesses:
  T. F. KEHOE,
  M. B. PHILIPP.